(12) United States Patent
Alexander et al.

(10) Patent No.: US 8,301,724 B2
(45) Date of Patent: *Oct. 30, 2012

(54) TARGETED MEDIA ADVERTISING OVER NETWORKS

(75) Inventors: Justin Alexander, Jerusalem (IL); Rob Schweitzer, Maitland, FL (US); David S. Morganstein, West Palm Beach, FL (US); Brian K. Buchheit, Davie, FL (US)

(73) Assignee: David S. Morganstein, West Palm Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/306,837

(22) Filed: Nov. 29, 2011

(65) Prior Publication Data

US 2012/0136725 A1    May 31, 2012

Related U.S. Application Data

(63) Continuation-in-part of application No. 10/639,731, filed on Aug. 12, 2003, now Pat. No. 8,090,798.

(60) Provisional application No. 60/402,551, filed on Aug. 12, 2002.

(51) Int. Cl.
*G06F 15/16* (2006.01)
(52) U.S. Cl. .................. 709/217; 705/14.4; 705/14.49; 705/14.51; 705/14.73
(58) Field of Classification Search .................. 709/217; 705/14.4, 14.49, 14.51, 14.73
See application file for complete search history.

(56) References Cited

U.S. PATENT DOCUMENTS

| 6,195,680 | B1 | 2/2001 | Goldszmidt et al. |
| 6,314,451 | B1 | 11/2001 | Landsman et al. |
| 6,321,252 | B1 | 11/2001 | Bhola et al. |
| 6,526,275 | B1 | 2/2003 | Calvert |
| 6,895,430 | B1 | 5/2005 | Schneider |

(Continued)

OTHER PUBLICATIONS

Business Wire, Feb 15, 2005 "INTENT MediaWorks Releases First P2P Software to Prevent Illegal File Trading" http://findarticles.com/p/articles/mi_m0EIN/is_2005_Feb_15/ai_n9529886/ pp. 1-3.

(Continued)

*Primary Examiner* — Douglas Blair
*Assistant Examiner* — Oleg Survillo
(74) *Attorney, Agent, or Firm* — Patents on Demand P.A.; Brian K. Buchheit

(57) ABSTRACT

Advertising on networks can include a three-step system in one embodiment of the disclosure. The first step can include the review of search requests, followed by a response linking to a media file containing an advertisement. The second step can be a delivery process. The advertising cannot be considered spam as the user can be redirected towards information that can directly correlate to the users search. The advertising can be done with the full cooperation and volition of the media company or companies involved. The advertisers' contract with the media companies can allow for payment and the media companies can then expose their product to potential buyers. The third step can be contacting an advertising server any time that media file is played. In this third step it can be determined what the optimal advertisement for this media file is.

21 Claims, 13 Drawing Sheets

U.S. PATENT DOCUMENTS

| | | |
|---|---|---|
| 7,263,560 B2 | 8/2007 | Abdelaziz et al. |
| 2001/0037304 A1 | 11/2001 | Paiz |
| 2002/0007350 A1 | 1/2002 | Yen |
| 2002/0073075 A1 | 6/2002 | Dutta et al. |
| 2002/0161739 A1 | 10/2002 | Oh |
| 2003/0050966 A1 | 3/2003 | Dutta et al. |
| 2003/0097299 A1 | 5/2003 | O'Kane et al. |
| 2003/0191828 A1 | 10/2003 | Ramanathan et al. |
| 2003/0195852 A1 | 10/2003 | Campbell et al. |
| 2003/0212710 A1 | 11/2003 | Guy |
| 2003/0221009 A1 | 11/2003 | Standridge et al. |
| 2004/0034601 A1 | 2/2004 | Kreuzer |
| 2004/0039707 A9 | 2/2004 | Ricci |
| 2005/0038716 A1 | 2/2005 | Eagle et al. |
| 2006/0136577 A1 | 6/2006 | Stern et al. |
| 2006/0229904 A1 | 10/2006 | Hunter et al. |
| 2007/0061203 A1 | 3/2007 | Ellis et al. |
| 2007/0097885 A1 | 5/2007 | Traversat et al. |
| 2011/0302257 A1* | 12/2011 | Asher ........................... 709/206 |

OTHER PUBLICATIONS

By Catherine Holahan, News Analysis Feb. 26, 2007, "Advertising to the File-Sharing Crowd" http://www.businessweek.com/print/technology/content/feb2007/tc2007 pp. 1-3.

"INTENT MediaWorks Previews New "myPeer" P2P Software" by INTENT MediaWorks / Andy Cooper; Nov. 30, 2005 http://www.Free-Press-Release.com/.

"INTENT MediaWorks Briefs White House on Commercial Uses of P2P" Atlanta, GA—Mar. 16, 2005 http://www.creativeblaze.com/demos/intentMedia/press_pr_031605.html; pp. 1-2.

"The Future of Peer-to-Peer (P2P) Technology" Competition, Foreign Commerce, and Infrastructure Hearing Wednesday, Jun. 23 2004—2:30 PM—SR-253 by: Les Ottolenghi: pp. 1-13.

"Peer-to-Peer Advertising" by David Radd; Bloomberg BusinessWeek; Monday Apr. 26, 2010; pp. 1-2 http:/www.businessweek.com/innovate/content/jan2007/id20070103_060734.htm.

* cited by examiner

TARGETED MEDIA ADVERTISING OVER NETWORKS

CROSS-REFERENCE TO RELATED APPLICATIONS

Pursuant to 35 USC §120, this continuation application claims priority to and benefit of U.S. patent application Ser. No. 10/639,731, entitled "SYSTEM AND METHODS FOR DIRECT TARGETED MEDIA ADVERTISING OVER PEER-TO-PEER NETWORKS", filed on Aug. 12, 2003, the disclosure of which is incorporated herein in its entirety for all purposes, and which is based on provisional patent application No. 60/402,551, filed on Aug. 12, 2002, which is hereby incorporated by reference.

BACKGROUND

The present invention relates to the field of advertising, and more specifically, to direct targeted media advertising over networks.

In the traditional realm of media proliferation, a user can either purchase a copy of the media (such as in the form of a DVD, CD, e-book, etc.) or purchase access to broadcast media from a third party (e.g., television packages from COMCAST or VERIZON). These traditional venues allow for content providers to garner additional revenue from advertisement slots that a content provider can sell to an entity wishing to advertise their products or services to a targeted audience (the likely consumers who are purchasing or utilizing a specific media).

However, it has become increasingly more common for individuals to share files, especially media files, across networks. These networks are generally outside of the realm of media companies' or the media content originators' control. More specifically, file sharing networks and companies are seen by many as means for users to get free content, thereby benefiting from copyright infringement. Media companies and content providers generally suffer losses as users of these networks obtain for free what consumers would otherwise have to purchase.

BRIEF SUMMARY

The present invention provides a system and methods for targeted media advertising over networks that can be utilized for file sharing. The present invention also provides for targeting exact consumer market classification for delivery of tailored product sets.

The present invention, and all of its related components, is designed to adapt to the particular behaviors of the network to which it is connected. Communication is provided by available networks, via Ethernet, token ring, token bus, modem, or other hierarchical Local Area Networks (LAN) and/or Wide Area Networks (WAN) configuration.

In accordance with varying aspects of the present invention, the controlling logic provides for a particular sequence of execution. The controlling logic can be described as a process that includes attaching to a designated network, gathering necessary information on network for continued use, replicating the behavior of a client/server on the file sharing network, scanning for file search requests, and responding to file search requests with media files with advertisements. The process further includes analyzing requests made by the consumer's machine, allowing the consumer to play the found media file, and finally responding with an advertisement to be played before media presentation of the found file to the user.

In one embodiment, the present invention provides a system designed to expedite advertising on file sharing networks. This can be accomplished by a three-step system. The first step can include the review of search requests, followed by a response linking to a media file containing an advertisement. The second step can be a delivery process. The advertising cannot be considered spam as the user can be redirected towards information that can directly correlate to the users search. The advertising can be done with the full cooperation and volition of the media company or companies involved. The advertisers' contract with the media companies can allow for payment and the media companies can then expose their product to potential buyers. The third step can be contacting an advertising server any time that media file is played. In this third step it can be determined what the optimal advertisement for this media file is.

In another embodiment, when the system of the present invention is activated, it connects to the network in a manner similar to any other client/server application. The system then begins probing network traffic for file search requests. Upon discovering the file search request, the system responds with a custom media file designed to contact the system when played. The custom media file can contain a copy of the selected file with an embedded request for information (e.g., a hyperlink) for presentation to the person from whom the search request was received. The request for information can reference an advertising server containing advertisements to be displayed with the provided media file. When the user runs the downloaded content file the content file sends a request for service to a site (e.g., a reflector server) that responds by serving information such as advertising to the requester.

These advertisements can, for example, take the form of pop-up advertisements. Furthermore, the ads, while involuntary, are targeted to the characteristics of the afore-mentioned media file, therefore reducing the receivers' resistance toward the advertisement. Therefore, the disclosure can provide methods of advertising on a file sharing network in a manner beneficial to both media companies and users.

The above process provides a user with a symbiotic way deriving profit from file sharing, which is currently costing them billions in revenue every year. This is a way of advertising on file sharing networks without fear of retaliation by hackers or consumer backlash. The systems and methodology of the present invention also allow businesses or individuals to limit the proliferation of unauthorized copies of their media by making legitimate copies of copyrighted material more common on file sharing networks than pirated materials. Since the present invention is more efficient than regular network clients, it is capable of saturating the return search client with legitimate materials containing advertisements.

DETAILED DESCRIPTION

The disclosure provides a solution for safeguarding against potential losses of copyright owners' revenue stream and rights infringement. In fact, the disclosure provided solution can allow owners or providers to profit from the proliferation of file sharing networks by allowing content owners to sell to other entities a set of file embedded, direct, targeted advertising that file-sharing communities are likely to accept.

Figure 1:
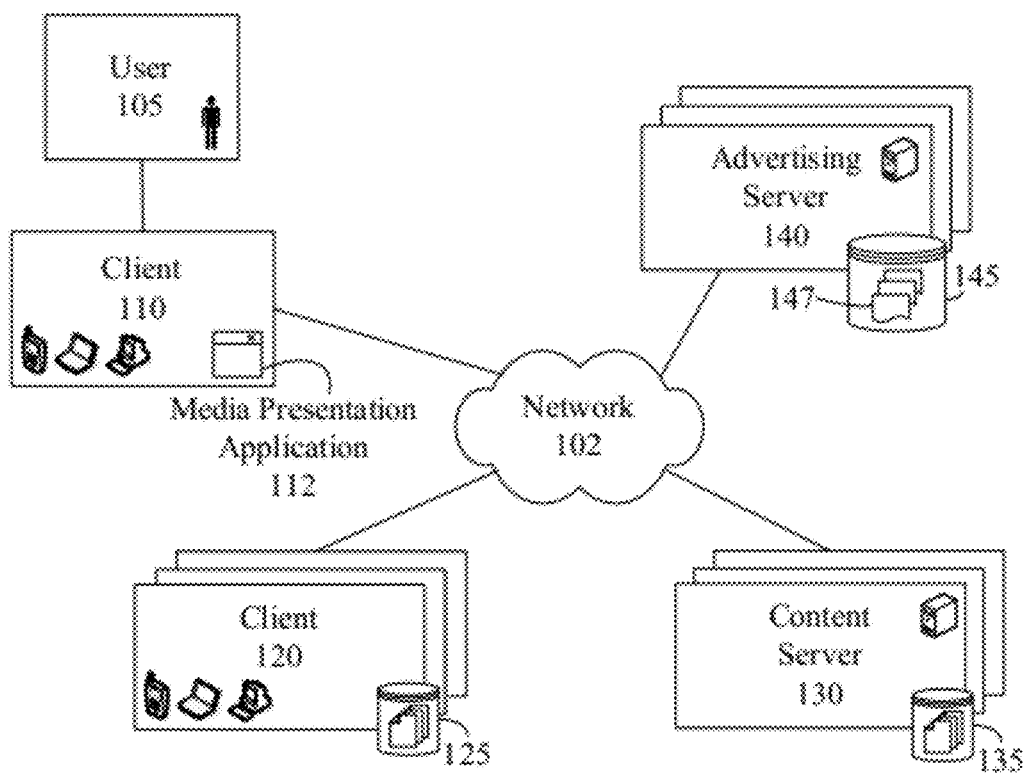
FIG. 1 is a schematic diagram illustrating a system for file distribution and targeted advertisement system in accordance with embodiments of the inventive arrangements disclosed herein.
Figure 1:
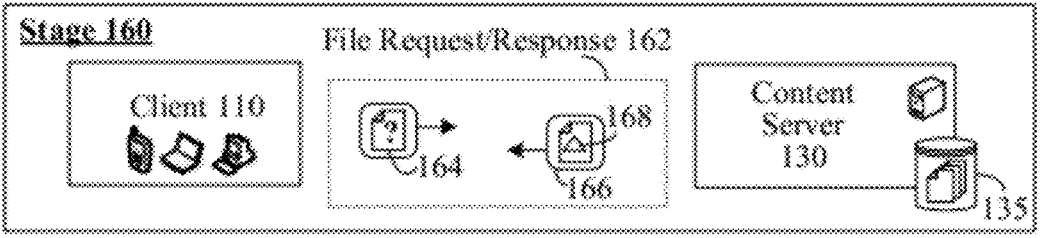
Figure 1:
Figure 2:
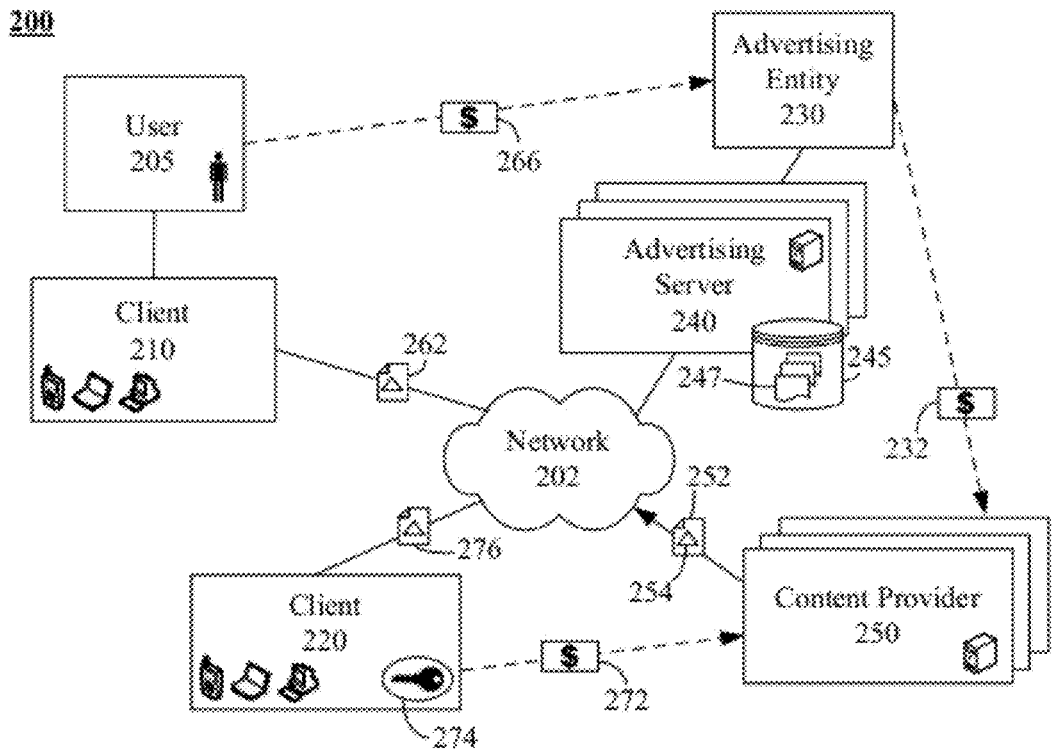
FIG. 2 is a block diagram depicting revenue flows and content and targeted advertisement distribution in a network in accordance with embodiments of the inventive arrangements disclosed herein.
Figure 3:
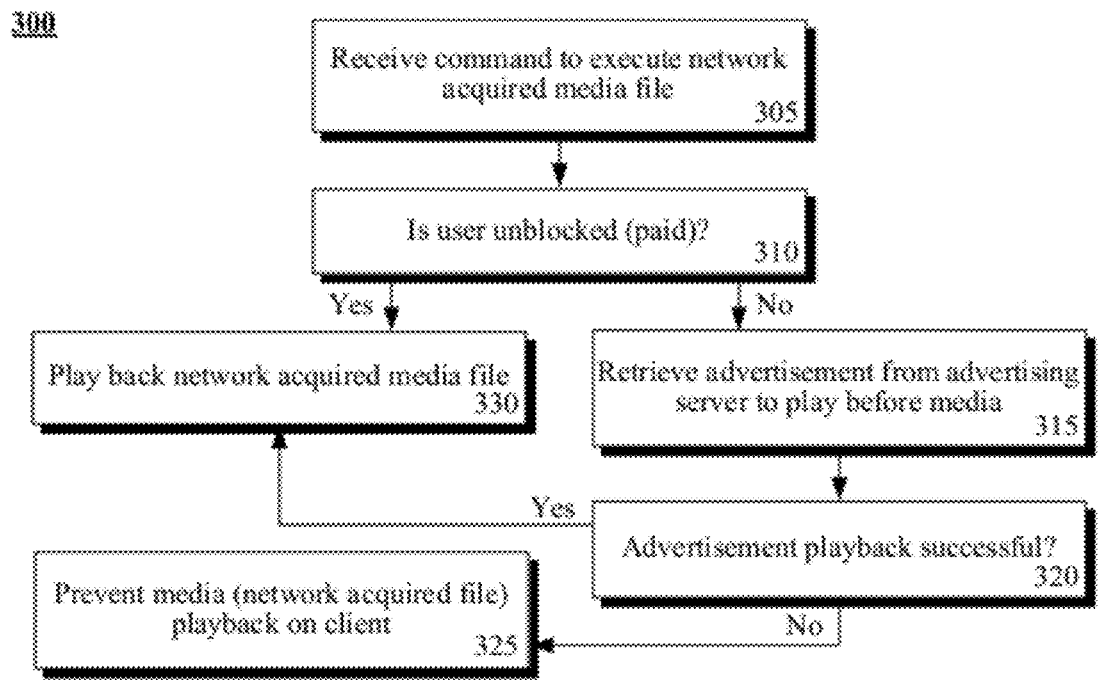
FIG. 3 is a flow chart of a method for media playback of content acquired over a network contingent on targeted advertisement viewing over a network in accordance with embodiments of the inventive arrangements disclosed herein.

It should be noted that the disclosure may be embodied in many different forms and should not be construed as limited to the embodiments set forth herein. Rather, these embodiments are provided so that this disclosure will be thorough and complete, and will fully convey the scope of the invention to those skilled in the art. FIGS. 1 to 3 attempt to discuss the disclosure in general terms, while FIGS. 4 to 13 illustrate one of many potential specific embodiments. For FIGS. 4 to 13, like numbers refer to like elements throughout. The prime notation, if used, indicates similar elements in alternative embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for network file distribution and targeted advertisement system in accordance with embodiments of the inventive arrangements disclosed herein. The system can include user 105, client 110, media presentation application 112, client 120 with data store 125, peer 130 with data store 135, and advertising server 140 with data store 145 maintaining advertisements 147 and can connect the elements via a network 102.

User 105 can utilize client 110 to retrieve a file over network 102 to be played on media application 112. The file request can be fulfilled by other clients in the network, e.g., client 120 with data store 125 or content server 130 with its corresponding data store 135. Content server 130 can, in one embodiment, appear the same as client 120 would on network 102. Advertising server 140, with data store 145, which maintains advertisements or advertisement links 147 can be accessed by client 110's media presentation application 112. Alternatively, another application (such as, for example, client 110 browser) can retrieve and playback a user 105 targeted advertisement 147.

In one embodiment, stage 160 can demonstrate, along with step 180, the process for targeted advertising in a network. Client 110 can initiate a file request/response 162 session, during which client 110 can send a file request 164. Content server 130 can respond by sending file 166 with embedded advertisement link 168 from its data store 135.

Stage 180 can illustrate a set of steps 182 to step 186 that can be performed on client 110 after receiving file 166 over network 102. In step 182, client 110 can retrieve advertisement 147 upon receiving an execute media 166 command initiated by user 105. Following, in step 184, client 110 can determine that playback of the advertisement 147 was successful and responsively play back content of media file 166. Alternately, if client 110 determines that advertisement playback was not successful, client 110 can stop the process and prevent media content of file 166 to be displayed on client 110.

In various embodiments, network 102 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 102 can include local components and data pathways necessary for communications to be exchanged among computing device components and between integrated device components and peripheral devices. The network 102 can also include network equipment, such as routers, data lines, hubs, and intermediary servers which together form a packet-based network, such as the Internet or an intranet. The network 102 can further include circuit-based communication components and mobile communication components, such as telephony switches, modems, cellular communication towers, and the like. The network 150 can include line based and/or wireless communication pathways.

Network 102 can be a client-server network and/or a peer-to-peer network. A client-server network can be a distributed computing environment that partitions tasks or workloads between the providers of a resource or service, called servers, and service requesters, called clients. Often clients and servers communicate over a computer network on separate hardware, but both client and server may reside in the same system. A server machine is a host that is running one or more server programs which share their resources with clients. A client does not share any of its resources, but requests a server's content or service function. Clients therefore initiate communication sessions with servers which await incoming requests. Many software applications written today use the client-server model for networking, as do the Internet's main application protocols, such as HTTP, SMTP, Telnet, and DNS.

A client-server network involves multiple clients connecting to a single, central server (or a server farm or set of servers having a unique address. Servers are often identified by a unique identifier, such as a URL or a domain name (one maintained by a DNS server). A domain name can be an identification string that defines a real of administrative autonomy, authority, or control in the Internet. A file server on a client-server network can be a high capacity, high speed computer with a large hard disk capacity.

By contrast, peer-to-peer networks involve two or more computers pooling individual resources such as disk drives, CD-ROMs and printers[2]. These shared resources are available to every computer in the network, while each two of them communicate in a session. Each computer can act as both the client and the server which means all the computers on the network may be treated as equals, that is where the term peer-to-peer comes from.

FIG. 2 is a block diagram 200 depicting revenue flows and content and targeted advertisement distribution in a network in accordance with embodiments of the inventive arrangements disclosed herein. It should be noted that revenue flows can also be performed in a manner different than what is illustrated here. In the embodiment discussed next, content providers receive compensation for media content supplied to a network and targeted advertising to a client accounts for the revenue stream from advertising entities to content providers.

More specifically, in this embodiment, an advertising entity 230 can provide payment 232 to content provider 250. Payment 232 can be performed just as an advertiser would pay for a regular advertisement slot during content broadcast over television networks, etc. In return, content provider 250 can release media file 252 to network 202 with an embedded advertisement link 254 that can activate upon playback on a client.

Client 210 can request and receive media file 262 (which can be a copy of the content provider supplied file 252) with the embedded advertisement link 264. It should be noted that to the user 205 of client 210 the file 262 with the embedded advertising link 264 can look identical to any other file of the same content offered on the network.

User 205 can request playback of file 262 on media presentation application 212. Before playback of the media file 262 can occur, however, client 210 can retrieve an advertisement 247 stored in data store 245 of an advertising server 240. Upon successful playback of the retrieved advertisement (which can be a dynamic user 205 targeted advertisement), media presentation application 212 can play the content of file 262. In this instance, the hope can be that a user 205 can provide product payment 266 to an advertising entity 230 by purchasing products or services that have been presented as a result of the network retrieved advertisement 247.

Alternatively, client 220 can, after a payment 272 to a content provider 250 (or in another embodiment also to an optional third party content server) receive an unblock key or unlock token 274 that can allow client 220 to skip any required advertisement retrieval and playback before file 276 content execution. In one embodiment, authentication as to whether or not targeted advertisement playback is required can be performed before file 276 download so client 220 can optionally receive file 276 without the embedded advertising link. In this instance, the file without the embedded advertisement link can include restrictions against further propagating or sharing the file so as to ensure continued targeted advertising revenue streams for the content provider 250.

FIG. 3 is a flow chart of a method 300 for media playback of content acquired over a network contingent on targeted advertisement viewing over a network in accordance with embodiments of the inventive arrangements disclosed herein. The flowchart shows a set of steps (steps 305-330) that can occur in accordance with the inventive arrangements disclosed herein to distribute and ensure proper distributed media file playback dependent on successful advertisement playback parameters before media playback.

The method can begin in step 305, where after having downloaded a file from a network the client 210 can receive a command to execute the network acquire media file. In step 310, client 210 can perform a check whether the user is unblocked, i.e., whether the user has paid to avoid the otherwise mandatory advertisement playback.

Should the user not possess the necessary key or token to bypass the advertisement playback requirement, the method can continue to step 315, during which the client 210 can retrieve an advertisement from an advertising server to be played before media playback of the network acquired file becomes available on client 210.

In step 320, a check can be performed to determine whether or not a required advertisement play back was successful. Should the advertisement not have played successfully, the method can proceed to step 325 and prevent the network acquired media playback on client 210. It should be noted, that alternatively, the method could retry playing the advertisement, delay playback by a certain amount of time, or prompt the user with an opportunity to purchase a key or token to unlock the content.

If, on the other hand, the advertisement did indeed play successfully, the method can proceed to step 330, during which the network acquired media file can be executed on client 210. If in step 310 it is revealed that the user is unblocked (i.e., has a key or token which can designate to skip advertisement requirements), the method can proceed from step 310 directly to step 330 and play back the network acquired media file.

It should be understood that the preceding FIGS. 1-3 are intended to provide an overview of the core aspects of the disclosure. The overview of the general case includes solely the necessary aspects of the disclosure but it should be understood that the disclosure can be adapted and expanded upon as necessary to perform scaling or bifurcate and separate some of the functionality to increase security, throughput, and the like.

More particularly, the system of the disclosure facilitates advertising on file sharing networks. Network users are directed to information that directly correlates with their interests. Thus, a user comes in contact with music, media files (i.e., content), and other products of which they may not have known before. These products are directly correlated to the interests of the user. The system described allows media companies that wish to profit from the market available on networks to review user searches and to direct those searchers to information they will find interesting. This invention represents the marriage of P2P users' needs with content owners' desires to benefit from this widespread Internet phenomenon.

Any combination of components to achieve this goal in the manner disclosed is contemplated. For example, the following set of figures (FIGS. 4-13) is intended to illustrate a use case of another, more comprehensive embodiment of the disclosure within a different type of network (i.e., a peer-to-peer network). In this instance, the embodiment utilizes a set of servers, three servers with different functions, to achieve stronger throughput capacity. In yet another embodiment a server farm can be utilized. It should be understood that not all of the servers discussed in FIGS. 4-13 are necessary to perform the disclosure taught method of advertising in a network. In fact, none of the servers discussed in detail in the following use case embodiment are necessary.

As previously mentioned, the following discussed implementation of a use case in accordance with the innovative arrangements disclosed herein, contains a three server system to perform the following set of steps: The first step includes the review of search requests, followed by a response linking to a media file containing an advertisement. The second step is a delivery process. The third step is a server that is contacted any time that media file is played. This third server determines what the optimal advertisement is for this media file. These steps are, in the following embodiment, performed in a peer-to-peer network, but need not be done so.

As used herein, P2P or peer-to-peer file sharing allows users to download files such as music, movies, and games using a P2P software client that searches for other connected computers. The "peers" are computer systems connected to each other through a network. Thus, the only requirements for a computer to join peer-to-peer network are internet connection and P2P software. There are three general versions of peer-to-peer networks. The first generation of P2P software was a central server-based model. The second generation of P2P software is a user-based model. The third generation of P2P network differs from the first two models in that it creates a new network for every set of files instead of trying to create one big network of files using super nodes, web caches or servers. In this model, users can download various portions of a target file from numerous peers to combine for one full file.

Figure 4A:
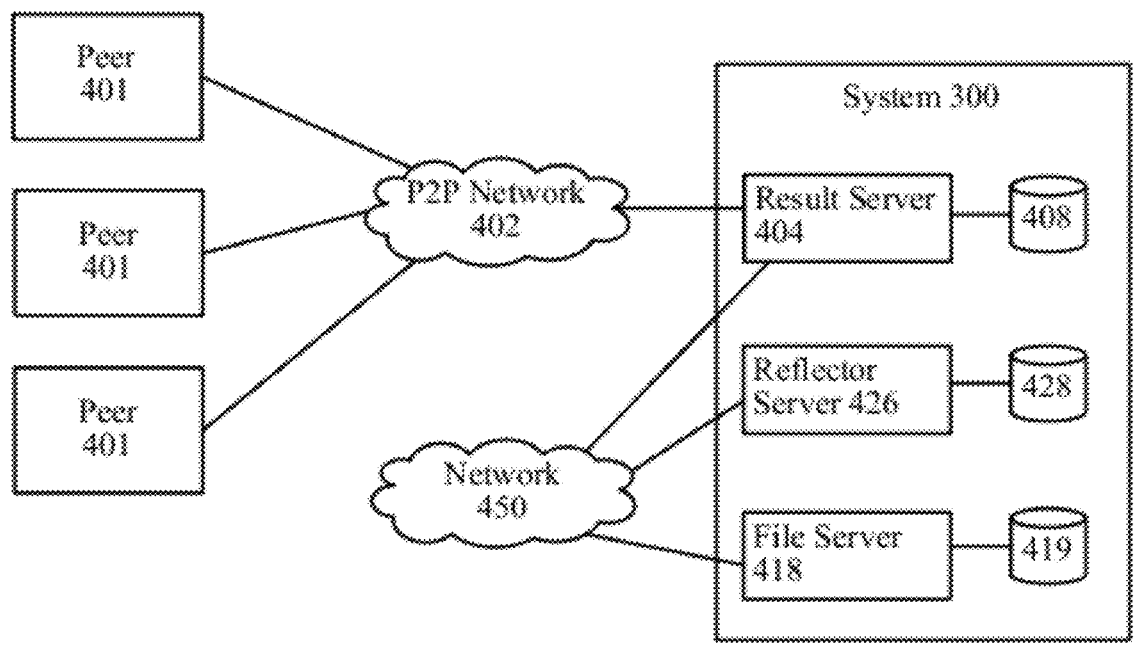
FIG. 4A is a block diagram depicting one embodiment of a content file distribution system in accordance with embodiments of the inventive arrangements disclosed herein.
Figure 4B:
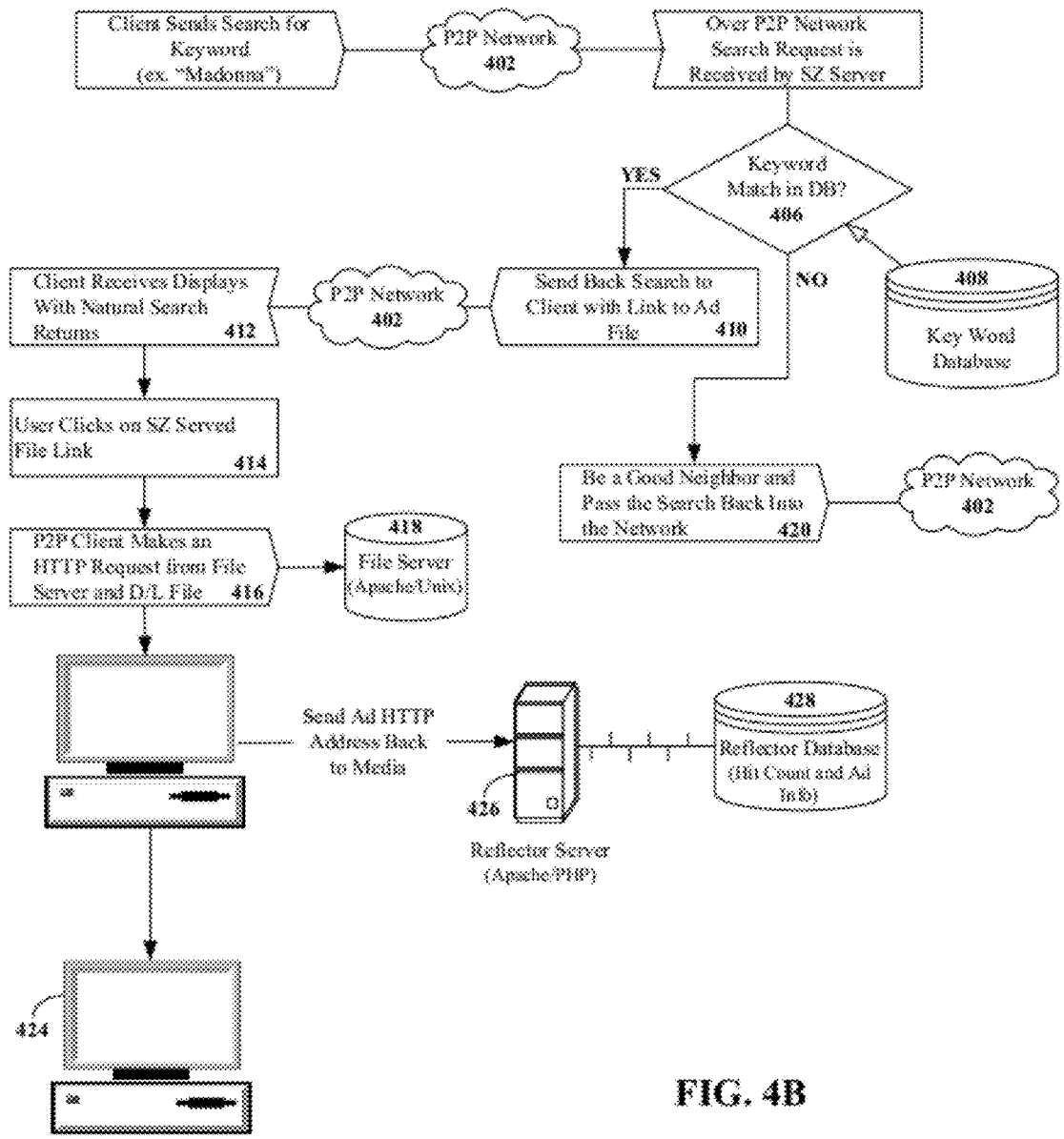
FIG. 4B illustrates a full event overview of one embodiment of the entire peer-to-peer content file distribution system in accordance with embodiments of the inventive arrangements disclosed herein.

Referring to FIG. 4A, there is shown a simplified block diagram of a network comprising a system 400 for distributing advertising in a P2P Network 402. The Network 402 comprises a plurality of peers 401 and the system 400 that operates according to the invention. The system 400 comprises a result server 404 that operates as a well-behaved peer in the P2P Network 402. The results server 404 is coupled to a database 408 that stores key words that correspond to content files that have been modified according to an aspect of the invention to include information in addition to the content corresponding to received search criteria. The result server 404 receives requests for content files just as other peers 401 do. The system 400 can either be connected to or comprise a File Server 418. The File Server 418 controls a database 419 that stores a plurality of content files.

The system 400 can further comprise a Reflector Server 426 for receiving requests for service from peers receiving copies of files stored in the content database 419. The Reflector Server 426 is coupled to a reflector database 428 that stores information such as advertising for serving to peers receiving content files stored in the content database 419.

The File Server 418, Reflector Server 426, and the databases 419 and 428 are shown as connected to a network 450 that may comprise the P2P Network 402. Optionally, only the result server 404 is a peer in the P2P Network 402 and the other servers/databases are other nodes in the network 450.

The above process provides a user such as a content distributor with a means for deriving profit from P2P file sharing the systems and methodology of the present invention also allow businesses or individuals to limit the proliferation of unauthorized copies of their media (content) by making legitimate copies of copyrighted material more common on P2P networks than pirated materials. The system 400 is capable of providing the return search client with legitimate copies of materials containing advertisements.

System 400 is adapted to the particular behaviors of the P2P network to which it is connected. Available networks, via Ethernet, token ring, token bus, modem, or other hierarchical Local Area Networks (LAN) and/or Wide Area Networks (WAN) configuration provide communication.

In accordance with varying aspects of the present invention, the controlling logic provides for a particular sequence of execution. The controlling logic can be described as a process that includes attaching to a designated network, gathering necessary information on network for continued use, replicating the behavior of a client/server on the P2P network, scanning for file search requests, and responding to file search requests with media files with advertisements. The process further includes analyzing requests made by the consumer's machine, allowing the consumer to play the found media file, and finally responding with an advertisement.

When the system 400 of the present invention is activated, it connects to the P2P network 402 in a manner similar to any other peer client/server application. Then, if necessary, depending on the network in question, the system retrieves critical networking information needed to continue operating as part of the P2P network. In a method according to the present invention, the server 404 models the behavior of other peer client/servers 401 on the network 402. This allows the system 400 to secure and retain access to the P2P network 402. The system 400 then begins probing network traffic for file search requests. Upon discovering the file search request, the system 400 responds with a custom media file designed to contact the system 400 when played. When contacted, the system 400 references an internal database 428 containing advertisements to be displayed with this media file. These ads can take the form of pop-up advertisements. The ads, while involuntary, are targeted to the characteristics of the aforementioned media file, therefore reducing the receiver's resistance toward the advertisement. Thus, the present invention provides methods of advertising on a P2P network in a manner beneficial to both media companies and users.

Implementations of the invention comprise (a) a specific series of events or steps utilizing specific system methodology needed to process each of the events/steps, and (b) the three different server types discussed above. The process begins with the search results server 404, which is a variant/clone on any P2P Client (hereinafter "P2P client"). A P2P client 401 consists of any software that connects to other copies of itself on other computers over a network 402. Once connected, the P2P client 401 exchanges information through the established connections. In a typical P2P network all of the copies of a P2P client/server have equal rights, permissions, and duties on the P2P network. The P2P client/server 401 is so named because P2P-networked computers share data by both serving (server) and receiving (client) files. The search result system mimics the P2P client/server software, thus allowing it to serve advertising over the P2P network.

The Result Server 404 enters into any P2P network (e.g., network 402) and acts as a well-behaved neighbor on that network. A P2P network allows members of the network to use certain files in each other's hard-drives equally. This is in contrast to a server network where one machine (the server) offers access to its files, but the other computer (the client) does not. In this example, the network contains thousands of computers that pass messages to one another, spreading the messages across the network 402. This allows the members 401 to share files with each other. Every computer making requests also shares information on its own computer in a similar fashion. Well-behaved neighbors consist of those members 401 of the network through whom connections to the network are established. Well-behaved neighbors V are computers that behave like any other member of the network, or at least seem to behave like any other member, by passing messages when requested.

Just like any other client/server on the network, the Result Server 404 passes along search requests and results. However, with the search result server, every search is compared against its own internal database 408 to see if the incoming search is relevant to files hosted on the system 400. A data search is relevant if it contains information that correlates to keywords in the internal database. The Result Server 404 requests and receives information from the internal database 408 specific to the given search request. An appropriate response to the search request originated by the peer 401 is generated and transmitted back. This return transmission contains a link to a media file located on the system 400 file servers.

If the user clicks on the link to our media file, located on the File Server 418, the user then sends an HTTP (a standard industry protocol) message back to it. The File Server 418 consists of little more than a web server. This is all that is necessary to transmit files to users according to the invention. Additional operations on the File Server 118 may include error checking for misnamed requests, redirection to less busy file servers, and activity logging.

If the user downloads the media file from the File Server 418, and then plays (runs) the media file, the Reflector Server 426 is contacted. The media file contains instructions to the media player (a program designed to read, and or display a given media type) to "pop-up" a browser window and to display in the media player its contents, the information provided by the online Reflector Server 426. To do this, the pop-up window goes online and contacts the Reflector Server 426. The Reflector Server 426 uses an internal database to identify the media file being played, and locates the appropriate advertisement. Each media file is encoded with a particular Unique ID that it transmits to the Reflector Server during the pop-up phase. The Reflector Server keeps track of the number of hits—the time each ad is requested per Unique ID received through each pop-up.

The internal' database and the search Result Server 404 allow us to direct market/direct target P2P users. For example, someone may be searching for "Madonna" files. The system's technology enables the company to serve links to media files of an artist whose music is similar. The Result Server 404 allows us to serve media files by transmitting a response back to the originator of the search alerting the recipient that we do have a file they would be interested in and it is labeled as "Madonna-like."

The Result Server 404 response comprises the positive results of user file search requests. Results are typically displayed in a top-down list format. Most P2P clients give users the ability to choose different sorting methods for the results. Some of the advanced P2P clients use a tree view where search responses from different locations are placed on a single tree branch. This permits users to look for the fastest download of a particular file across the P2P network. The more times a file is "found," the more times it is listed in the P2P client search response and the greater the chance the user will download the file.

The Result Server 404 acts as both search engine and recommendation engine and allows the searcher to know exactly what they are downloading. This is in exact opposition to the nature of spam, which is untargeted, unsolicited, and indirect advertising which tricks the user into viewing material that the user may not be interested in. The system 400 ensures that anyone who downloads its content knows what he or she is downloading and is interested in the content. Anyone who downloads search result's content is interested in its content. Unlike with spam, there is no wasted bandwidth. The users are not forced to listen to or see things in which they have no interest.

The current invention improves upon unsolicited advertisements currently in use because it uses targeted solicitation. Targeted solicitation correlates a user's preferences or interests with a particular product being advertised. In contrast, spam uses untargeted solicitation and sends out advertisements to a large, but random, group of individuals without prequalifying their interest based on any other behavior. Untargeted advertising uses more bandwidth because it must send out a huge number of "random ads" to make up for its lack of efficiency. It takes a far greater number of untargeted ads to sell the same amount of product as with 'targeted ads.

Following are examples of spam, untargeted advertising, and unsolicited advertising. The Result Server 404 allows for targeted advertising:

Example 1) a user viewing a Madonna song gets an ad for Toothpaste popping up on their screen. The ad was neither requested nor targeted towards the recipient. This is spam.

Example 2) a user receives an e-mail from an unknown source for Toothpaste. This is spam.

Example 3) a user is subscribed to a free music service that makes its money through advertisements, included in the downloads. The user views a Madonna video and a Toothpaste ad pops up. This is not spam. This is solicited and untargeted advertising.

Example 4) a user downloads a Madonna song from a neutral source. The song contains an ad for The Colgate "Sparkling Future" Madonna Tour. This is NOT spam. This is unsolicited and targeted advertising over a non-subscription service. This example represents advertising using the system and methods for direct targeted media advertising contained herein.

Efficiency and high performance are required to handle user build-up. Since tens of thousands of people could potentially be downloading files at the exact same time, efficiency is of the utmost importance. Most P2P clients use the same bandwidth (and usually the same computer) to handle both their P2P connections (used for searches and communication over the P2P network) and their file sharing activities (used to upload and download files). This invention is only concerned with the downloading aspect of client activity. Each of the two activities over the P2P clients' bandwidth limits the other. For instance, the more connections to the P2P network that a P2P client hosts the fewer downloads it can allow, since each action (network connections, and downloads) require a portion of the inherently limited bandwidth.

This limitation is solved by creating a separate server for downloads and connections. In this embodiment P2P network connections are handled by the Result Server 404 and downloads are handled by the File Server 418. The File Server 418 is essentially a web server. The File Server 418 efficiently serves these files concurrently (i.e., at the same time). Moreover, since the downloaded files are generally somewhat large, taking ten or more minutes, concurrent user build-up is inevitable. Every user/browser requesting a file takes a little bit of time from the computer. The more files requested, the more time the action takes to perform.

Every user requires a portion of another entity's bandwidth to download a file. If one user is downloading, then the entity needs the bandwidth equivalent of that user's connection to the Internet (i.e., cable, DSL, modem, etc.). When multiple users are downloading files, then the entity needs the sum of their combined bandwidth. If the users downloading the files exceed the available bandwidth, then every user's download starts to slow and individual connections gradually become more and more unstable resulting in incomplete downloads and broken files. In general, the more bandwidth for serving files the better. In the case of serving files, web servers offer inexpensive bandwidth. This invention allows files to be downloaded from web servers instead of directly from P2P clients. Therefore, this invention allows for use of the cheap bandwidth web servers offer. Web servers can be rented for extremely low rates in an industry standard practice called virtual hosting.

When the user clicks on a hyperlink in the search response, directed to the user from the result server, the user is transparently redirected to a file server, which may be completely independent of the Result Server 404. The whole process is handled automatically, and quickly, so that the user never experiences any service issues from the transition. Everything continues to behave exactly as it would under normal circumstances, and the process is presented in a way that is familiar to the user.

The File Server 418, upon receiving the file request, takes a moment to log the user's IP address (the 32-bit location of a computer on the Internet) and inspects and logs any available information for later demographical studies and statistical analysis. The File Server 418 also checks to see how busy it is with all of its other clients. If the File Server 418 is currently too busy to service the request, it bounces the file request to another server (through redirect) that then begins the file server process all over again.

Once the user has downloaded a requested file it is assumed that the user will want to play it. The downloaded files are in special formats chosen for their ability to pop-up web browsers when played or to contact the remote Reflector Server. Some formats, such as Windows Media files, Real Media files, and QuickTime video, support pop-up windows whereas other formats, such as MPEG files (media files that send video), do not. Often used for advertising, pop-up web browsers are browser windows that open (are launched automatically) without user intervention. The files are hard-coded (i.e., unchangeable once committed to) to a URL such as www.osideas.com. When the pop-up browser loads this website it also sends a code uniquely identifying the content file that was played. The uniquely identifying code preferably comprises 32 characters (both letters and numbers) that are not repeated among the media files. Based on this information, as well as geographical information based on the user's IP address, we then redirect the popped-up browser to the website of a paying advertiser and keep an accurate log of how many times this has happened so that we know what to charge the advertiser.

One particular embodiment uses three different types of servers as mentioned above. We now discuss these servers further. Each server has a distinct function and role to play in the complicated process of analyzing searches and transmitting media advertising. The three server types are the Result Server 404, the File Server 418, and the Reflector Server 426.

The Result Server 404 represents the first stage of server interaction with the P2P network 402. The Result Server 404 logs onto the P2P network and begins transacting data like any other client/server on the network 402. The Result Server 404 follows the rules and protocol of the respective P2P network to which it connects, allowing it to act as a node in the network 402.

The Result Server 404, however, unlike any other P2P client, does not have any files of its own to share. Instead, it keeps a database of files that are located in or controlled by the File Server 418. It also keeps a record of acronyms for these files. For example, we may be carrying the song of an unknown heavy metal band (e.g., the "Lead Pencils") in our internal database. Let us assume that the unknown heavy metal band sounds just like Metallica, a popular mainstream band. While Lead Pencils may sound just like Metallica™ and Metallica™ fans would most likely enjoy the opportunity to get to know a band of similar style, Lead Pencils would normally never appear on a search by Metallica fans.

Therefore, the result server 404 allows record companies and other media outlets to reach a previously untapped audience by redirecting users to media the user has most likely never been exposed to but will likely enjoy. The Result Server does this by searching out keywords that indicate which products in the internal database the P2P user would most likely be interested in. When the Result Server finds a search request that matches its database of relevant keywords, it does not relay the search onto other P2P clients.

In the example search presented above, the Result Server would look not only for searches for "Lead Pencils," it would also look for keywords like "Metallica™," "Heavy Metal," "Enter Sand Man," "Justice for All," and "Lars Ulrich," all keywords indicating a propensity towards the media we wish to advertise for our clients. Since not all of "Lead Pencil's" songs sound like Metallica™ (i.e. some of their songs may sound like "Kenny GTM"), only the songs that sound like Metallica™ would have Metallica™ keywords associated with them. The Result Server 404 will also return any Metallica™ media files, which are available.

When the Result Server 404 finds a similarity between the search and any one of a number of entries in the internal database, the Result Server 404 responds by sending a search response that tells the user about the file and where to find it on the File Server. The search result search response is a message sent back by the Result Server 404 in the native tongue of the P2P network that it cooperates with. The process is completely transparent.

In some cases, the Result Server 404 will have the option to respond to the search with multiple hits for the same file. Since each search response that we send back to the user puts one more hit on the user's screen, the better the chance that they will click on one of the search responses. Multiple listings not only provide the opportunity to increase the likelihood that the user will see and click on a file, it informs the searcher that the file exists in more than one place on the file server.

We also can automatically give the user the ability to choose whichever file server is fastest for them on their particular computer system. Many P2P clients 401 will do this for the user automatically.

The File Server 418 is essentially just a web server, of any brand or version. It transfers files through any suitable protocol such as HTTP (hyper-text transfer protocol, an industry standard) and keeps track of file transfers. The File Server 418 is coupled to and controls a database 428 that stores media files comprising the content such as a song or movie and additionally stores instructions for the program used to run the media file to request additional information from a site such as the Reflector Server 426.

First, a P2P client 401 initiates a file request. If the server 418 controls the file name, that file is transferred as requested. If the file is not controlled by the system 400, the File Server 418 "guesses" what file name most closely matches the requested file name and returns that specific file. For example, if a user searches for a "Metallica" file, the File Server 418 might find a similar type of music related to a band called "Lead Pencils." The file name sent to the client is "Lead Pencils sounds like Metallica.wmf." If the user selects this file, a request is made to the File Server 118 for a file named "Lead Pencils sounds like Metallica.wmf." Since this file name is actually a creation of the Result Server 404 and does not really exist, the File Server 418 must find the closest matching file name that in this case will be "Lead Pencils.wmf." The job of the File Server 418 is to recognize that the requested file is in fact present, but under an assumed name, and to transmit that file to the user under the new name.

Once the user has downloaded the file that user is going to want to play it. When the file itself is played, it launches a web browser directed to a Reflector Server 426. Incorporated into the request to the Reflector Server 426 is the Unique ID of the sought file. This Unique ID is assigned to each media file stored on the File Server 418, but is not changed in-between multiple copies of each file. For instance, each copy of "Lead Pencils—We will Sleep.wmf" will contain the same Unique ID, regardless of what the file is named or how many times it is copied. This way the system 400 will be able to reveal user preferences.

The Reflector Server 426 keeps an accurate record of every pop-up window created, of every media file the pop-up came from, and to whom the pop-up window was sent. The Reflector Server does a quick analysis of the incoming request and redirects the user to the appropriate website, which is not part of the reflector. The Reflector Server identifies the incoming media file by way of the Unique ID included in the web page request made by the content file. Once the Reflector Server determines what the special code/unique ID is, it redirects the user to the website of a paying advertiser appropriate to the entertainment contained in the requested media file.

Once a user has downloaded a content file, the user continues to share it with other members of the P2P network via a viral effect. The viral effect refers to a pattern of replication from machine to machine. Each time the advertisement-containing file is transferred (now at the computer owner's request) from one machine to another over the P2P network, the file's rate of reproduction is increased exponentially.

Every downloaded file translates into another server sharing our content files (with ads attached). Therefore, if two people download from us and two people from each of them and two more from each of them we have spread the file to fourteen people at a cost of only two transactions. Thus, there is a geometric progression of people exposed to the advertisement.

Example of the viral effect:
Two people download from the system=2
Two people download from each of the initial two people=4 more
Two people download from each of the four people who downloaded from the initial two=8 more people
Total=14 (2+4÷8) people out of only 2 file downloads Despite the fact that the File Server 418 and the Result Server 404 may be down for days, the system continues to turn a profit so long as the Reflector Server 426 remains operational. Content files continue to spread across the network even without the system's help because of the viral factor discussed above.

The Result Server 404, however, does play a core role when it is running because its use greatly accelerates the transfer process by being far more efficient at distributing files than the average client/server. For example, the average user with a cable modem connection can only share a maximum of files at any given time. Unlike the average user, the Result Server 404 does not have to spend precious bandwidth on file transfer. A high efficiency file server instead handles bandwidth for file transfer. The high efficiency File Server 418 uses cheap bandwidth that can handle 10,000 downloads or more at one time. The Result Server 404 system therefore allows for many more downloads than conventional file transfer over a P2P network, giving an initial speed boost to transfer efforts and thus distributing the file faster.

Referring to 4B, a client search is initiated 401 and sent into the P2P network cloud 402, made up of similar P2P clients. At some point in the network cloud the Result Server 404 receives the search request. The search term is compared against an internal database of keywords 108 associated with the media located on the File Server 418. If there is a match 406 a search response is sent back to the client who initiated the search 410; otherwise, the packet is passed 420 along back into the network cloud 402. When the client receives the search response 412 it is displayed in a list format particular to their brand of P2P client (clients vary in style and design; however, with some clients, it is possible to identify them from their search request and send back a response best suited to that style of P2P client). If the user clicks 414 on the search response sent back to them from the Result Server 404, they will automatically be directed to make an HTTP request 416 for a file located on the File Server 418. Once downloaded, the media file can be played. The media file preferably contains a pop-up link to the Reflector Server 426. The reflector 426 receives a coded request from the pop-up link (from the media file, from the File Server) and then, based on that unique ID code, identifies the type of media (either of style, format, and or artist) that is making the request and redirects the client's pop-up link to the appropriate advertising located on a remote web server 426. The ad should then be successfully loaded by the client's default web browser like a normal web page 424.

Figure 5:
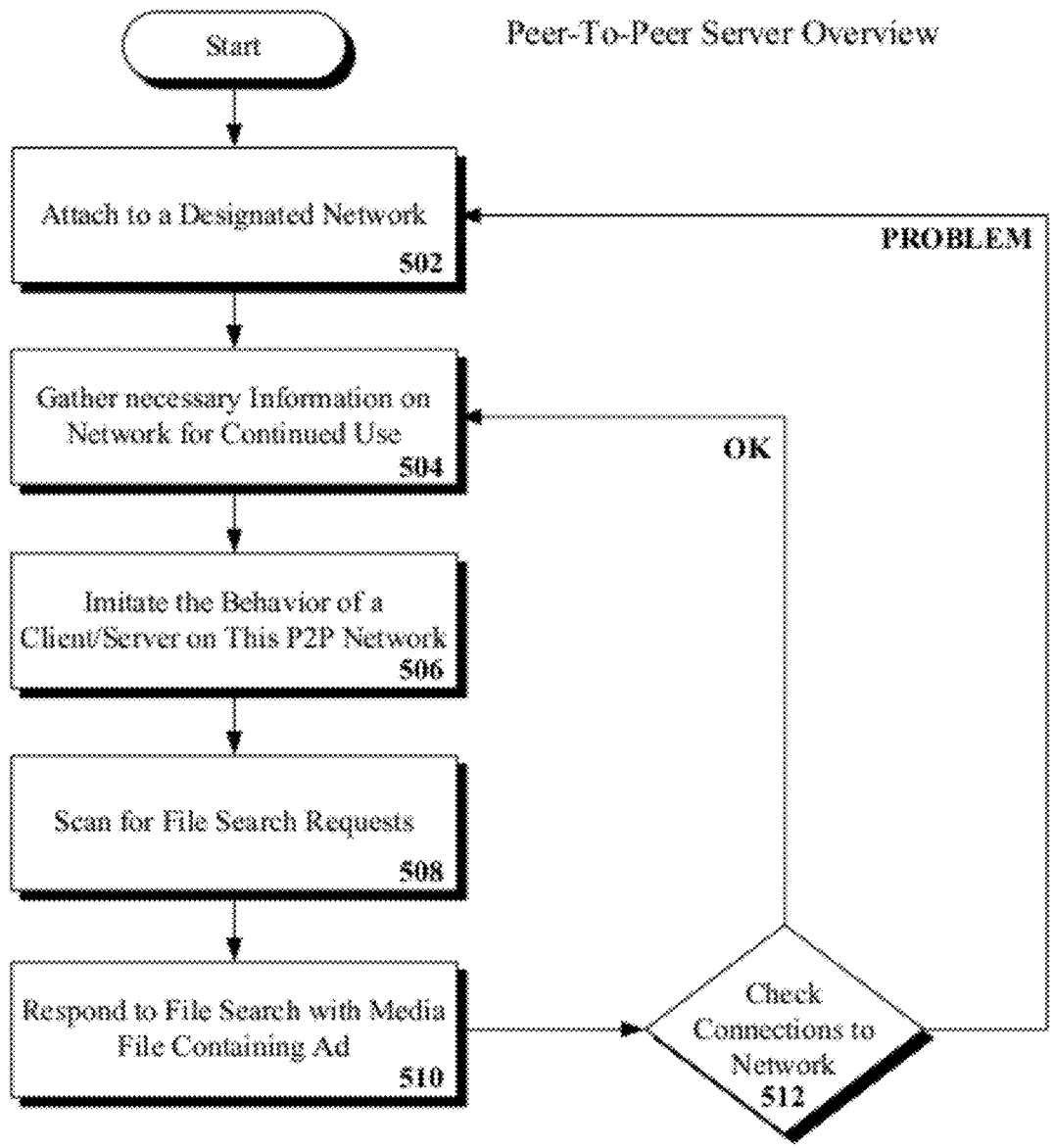
FIG. 5 is a flow chart illustrating an overview of the entire Result Server process in accordance with embodiments of the inventive arrangements disclosed herein.

Referring to FIG. 5, there is shown a flow chart illustrating a method 500 for the Result Server 404 attaching to a designated network. In order to begin receiving search packets over the P2P network, in step 502, the Result Server 404 must first connect to a P2P network (detailed in FIG. 6). To operate on this network, in step 504, the Result Server 404 gathers information about the current state of this P2P network (detailed FIG. 8). In order to retain access to this network, in step 506, the Result Server 404 must replicate the behavior of the P2P network (detailed in FIG. 9). Then in step 508 the Result Server 404 scans for file search requests that match the keywords database 408 (detailed in FIG. 10). If a search request does match something in the keyword database 408, then in step 510, the Result Server 404 responds with a link to media (content) contained on the File Server 418 (detailed in FIG. 11). In decision 512 the Result Server 404 also checks connections to the P2P network for slow response times, error prone behavior, or hostility (detailed in FIG. 7). If everything is all right, the Result Server 404 returns to step 504 and continues with normal operations; if not, it terminates this connection and gets a new one in step 502.

Figure 6:
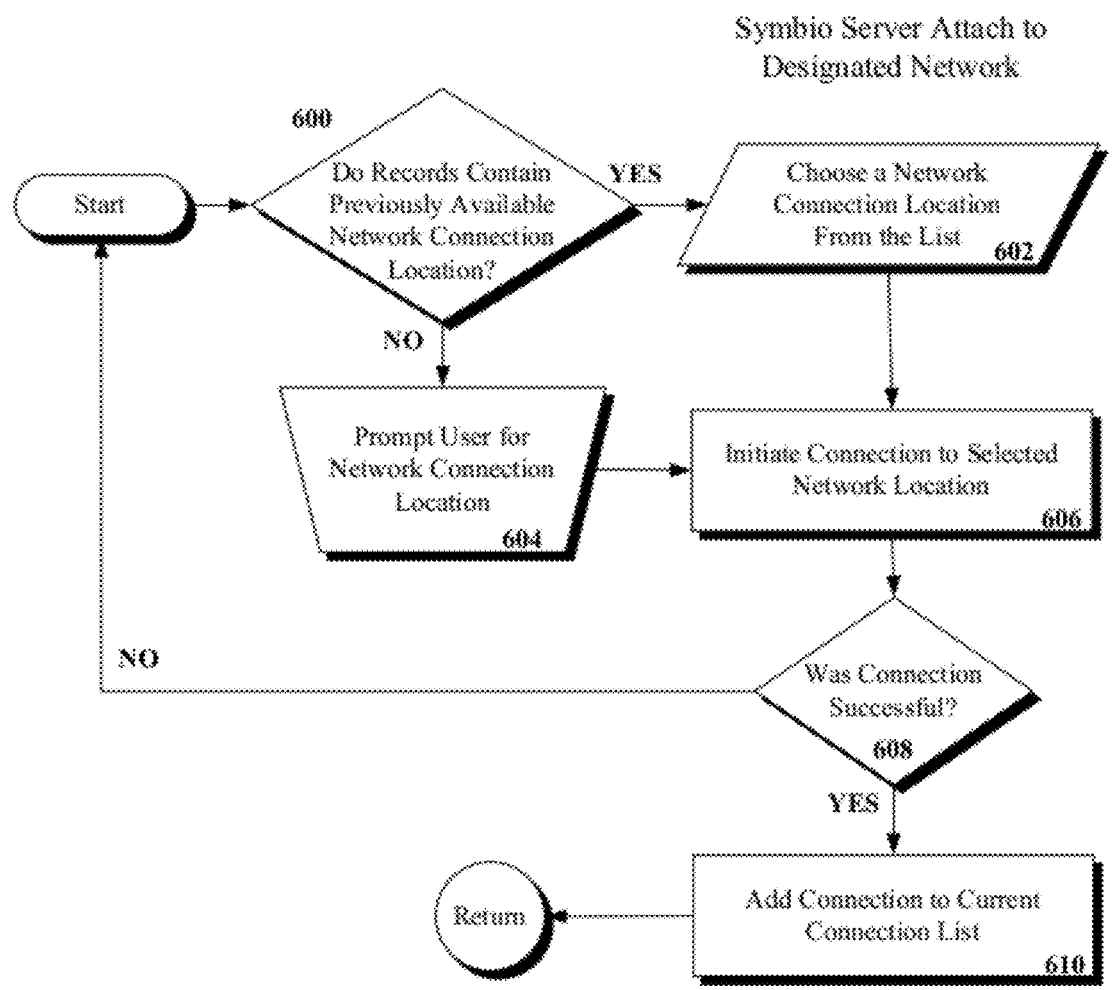
FIG. 6 is a flow chart illustrating how in one embodiment the Result Server attaches to the client/server network in accordance with embodiments of the inventive arrangements disclosed herein.

FIG. 6 depicts a connection command flow. In order for the Result Server 404 to connect the user to a P2P network, it must first know the address of at least one existing member of the P2P network. This address can be represented either by a domain name or, more commonly, a TCP/IP address and port. Thus in decision 600 the Result Server 404 determines whether the records contain previously available network connection information. If the Result Server 404 does have a preexisting list of TCP/IP addresses, in step 602 the Result Server 404 will choose a network connection location from the list and in step 606 will initiate a connection to the selected network location. If the Result Server 404 does not have a preexisting list of TCP/IP addresses (decision 600) (either from a previous run of the result server, or a list that comes packaged with the installation files), in step 604 it will prompt the user to enter an initial network address for the Result Server 404 to connect to. In decision 608, the Result Server 404 then determines whether the connection was successful. If the connection succeeds, in step 610 the Result Server 404 continues as illustrated, adding the connection to the current connection list. If, however, the connection fails, the Result Server 404 will return to the list of addresses and attempt to connect to the next address on the list. If there are no more addresses listed, the Result Server 404 will then prompt the user for a new address.

Figure 7:
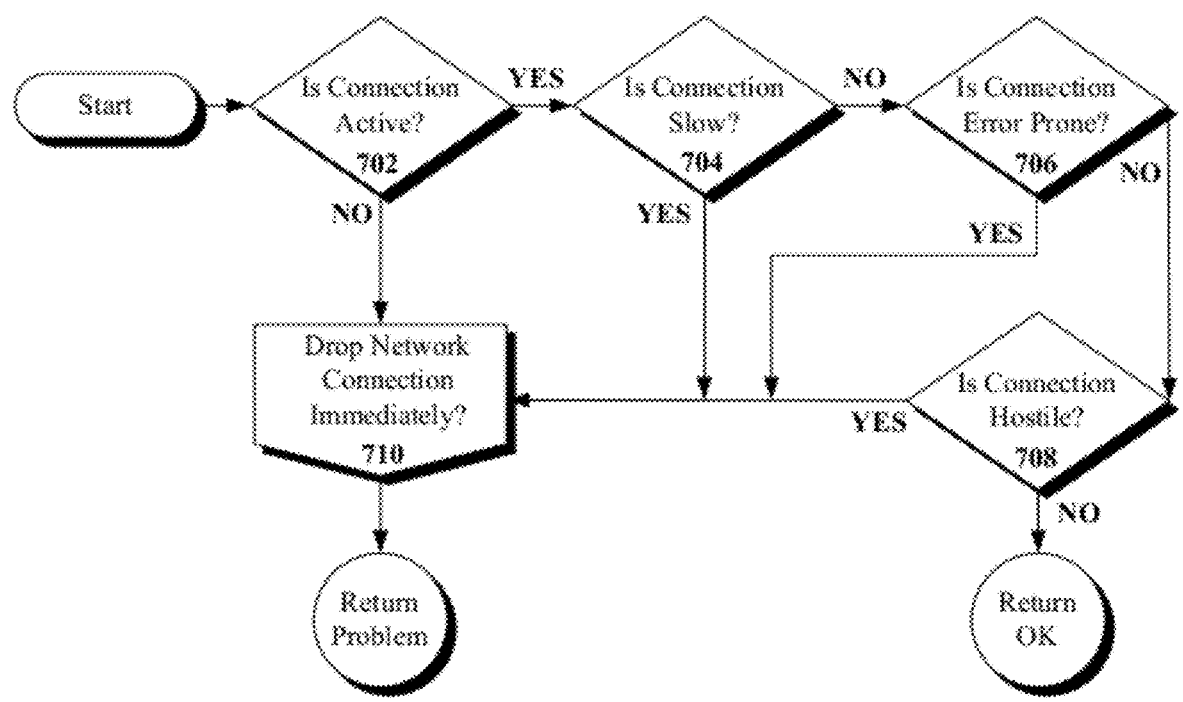
FIG. 7 is a flow chart illustrating how in one embodiment the Result Server scans for and detects delinquent or hostile connections in accordance with embodiments of the inventive arrangements disclosed herein.

FIG. 7 depicts how the Result Server 404 checks the neighbor connections for any signs of weakness or hostility. The program first determines if the connection is active (decision 702). If the connection is not active, running too slow for practical use (decision 704), or is prone to dropping 25% or more of the packets sent to it (decision 706), or if the connection shows advanced advertising detection features (decision 708), then the connection is terminated (decision 710) and the Result Server 404 then forms a new connection into the P2P network in the same fashion it connected in FIG. 6. If everything is all right, the Result Server 404 continues with normal operations.

Figure 8:
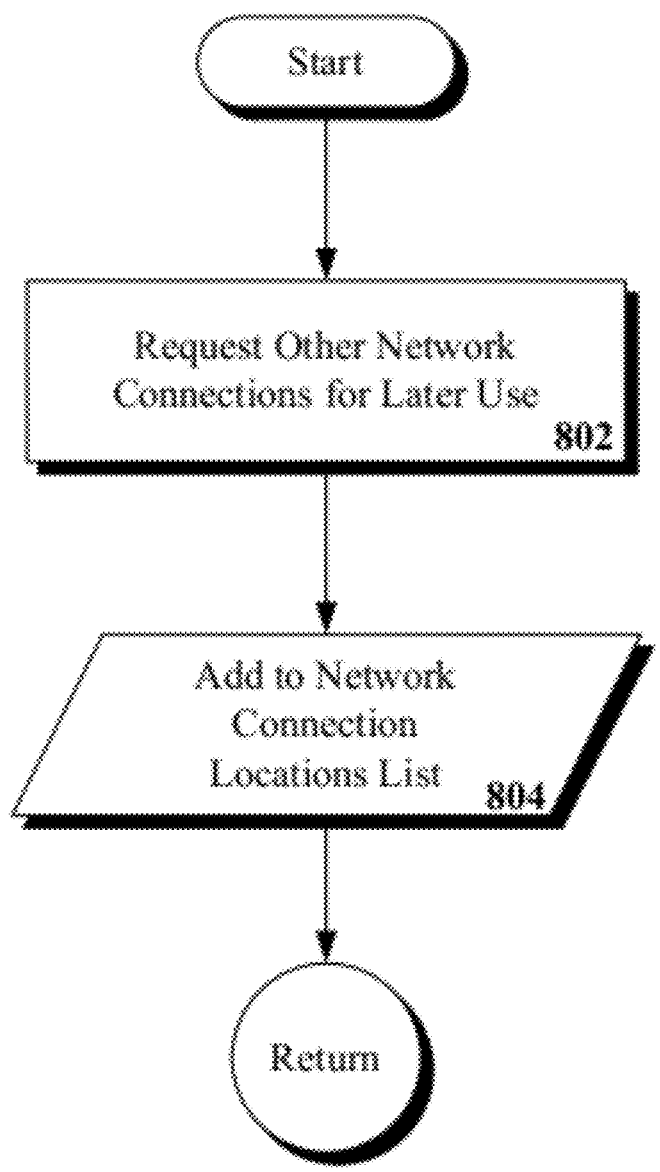
FIG. 8 is a flow chart illustrating how in one embodiment the Result Server gathers operating information on its host network in accordance with embodiments of the inventive arrangements disclosed herein.

FIG. 8 depicts how the software gathers necessary information for continued use by collecting network addresses. Every time the software runs, it will request new network address locations (step 802). This is essential and allows the software to operate indefinitely without prompting the user for additional connection addresses. Once received, addresses are recorded into the list (step 804). The list retains the addresses even after the software has been deactivated. This is advantageous in that the next time this software is operated it will already have a list of available connections. Every time a network status response is received, the process in FIG. 8 is executed. FIG. 8 continues to execute even while the software is running. This is, however, merely the result of multi-threading and in terms of programmatic logic it can be considered to only operate at the beginning of each connection cycle.

Figure 9:
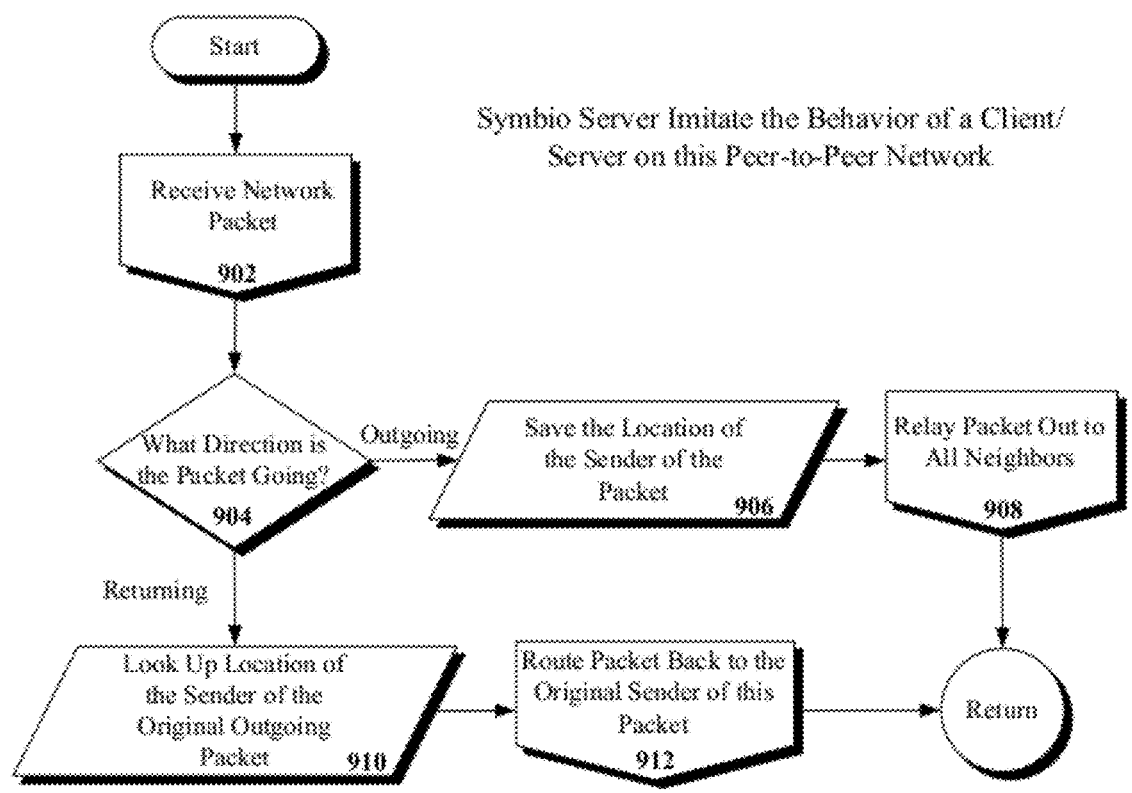
FIG. 9 is a flow chart illustrating how in one embodiment the Result Server directs network traffic over its client/server connections in accordance with embodiments of the inventive arrangements disclosed herein.

FIG. 9 shows how the software replicates the behavior of its neighbor client/server applications. Since the primary function of P2P network client/server applications is packet routing, that is exactly what the software does. The software allows the data traffic of the network to flow through it so that it becomes a full-fledged node on the network, similar to the client/servers. Since this packet routing makes up the majority of the software's traffic, its neighbors see it as a valid client server sending packets onto their proper destination just like them. The software receives a network packet (step 902) and determines what direction the packet is traveling (decision 904). If the packet is outgoing, the software saves the location of the sender of the packet (step 906) and relays the packet out to all neighbors (step 908). If, however, the packet is returning, the software will look up the location of the sender of the original packet (step 910) and route the packet back to the original sender (step 912).

Figure 10:
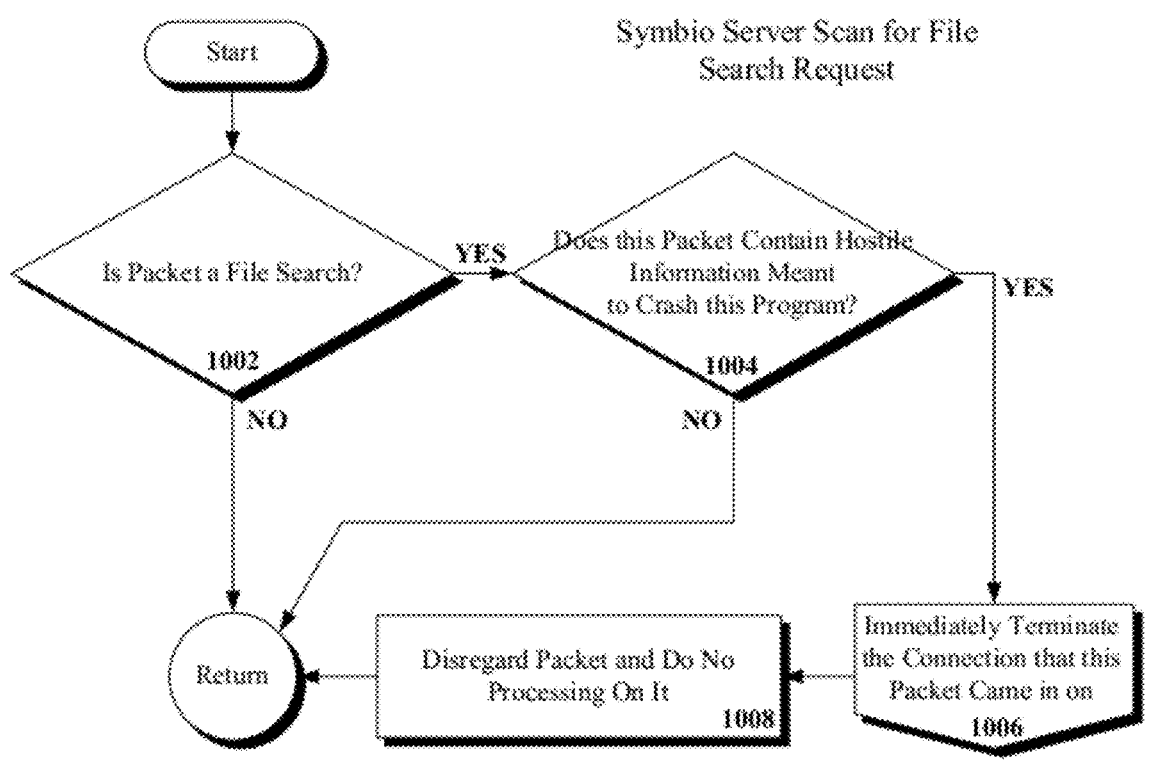
FIG. 10 is a flow chart illustrating how in one embodiment the Result Server scans incoming search requests for relevant search acronyms in accordance with embodiments of the inventive arrangements disclosed herein.

FIG. 10 depicts how the software scans the file search request by checking the packet for two things. First, the software determines if the packet is a file search (decision 1002). Since the Result Server 404 is only interested in file search packets, it is unnecessary to waste time processing other packets. If the packet is not a file search, it is returned back to the main system and sent along the network like any other packet. If it is a search packet, it is analyzed for hostile data (decision 1004). Hostile data is a search packet that is used to detect advertisers and spammers on P2P networks. The packet contains invalid data that only a spammer would respond to. Since this packet attracts suspicion by a nearby P2P client/server, it is best to disconnect (step 1006) and drop the hostile packet (step 1008), essentially destroying it. This way the Result Server 404 can now reconnect to a new node on the P2P network that is not currently suspicious of it.

Figure 11:
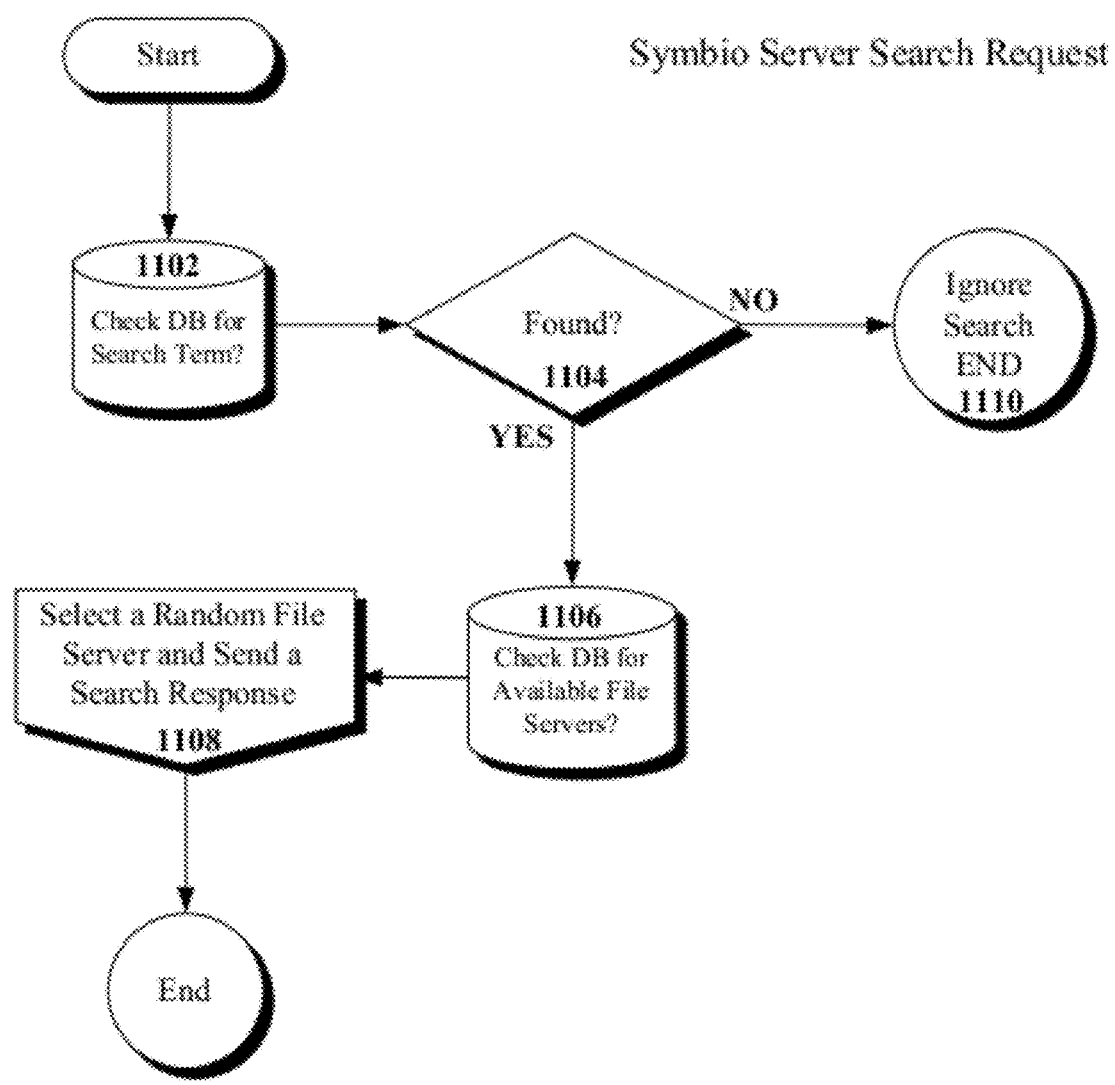
FIG. 11 depicts how in one embodiment the result server matches and responds to each search request in accordance with embodiments of the inventive arrangements disclosed herein.

FIG. 11 depicts how the Result Server 404 matches and responds to each search request. First, the incoming search term is compared against a list of keywords kept in a database (step 1102). Matches are non-case sensitive and can be partial in nature. For example, if a search requests "Mad" and the database contains the keyword "Madonna," the database will return the keyword "Madonna." Also, if the search request contains more characters then a keyword in the database, the database will still return the keyword. For example, if a search requests "Metallica" and the closest available keyword is "metal," then the database will return the keyword "metal." If there is no match (step 1104), then the search will be ignored and the Result Server 404 will go back to regular functioning (step 1110). If there is a match (step 1104), then the Result Server 404 will check the list of available file servers that can handle this file (step 1106) and then select a server at random (step 1108) to allow for an even bandwidth distribution (this random distribution can be altered to prefer one server over another based on the known bandwidth of each server).

Figure 12:
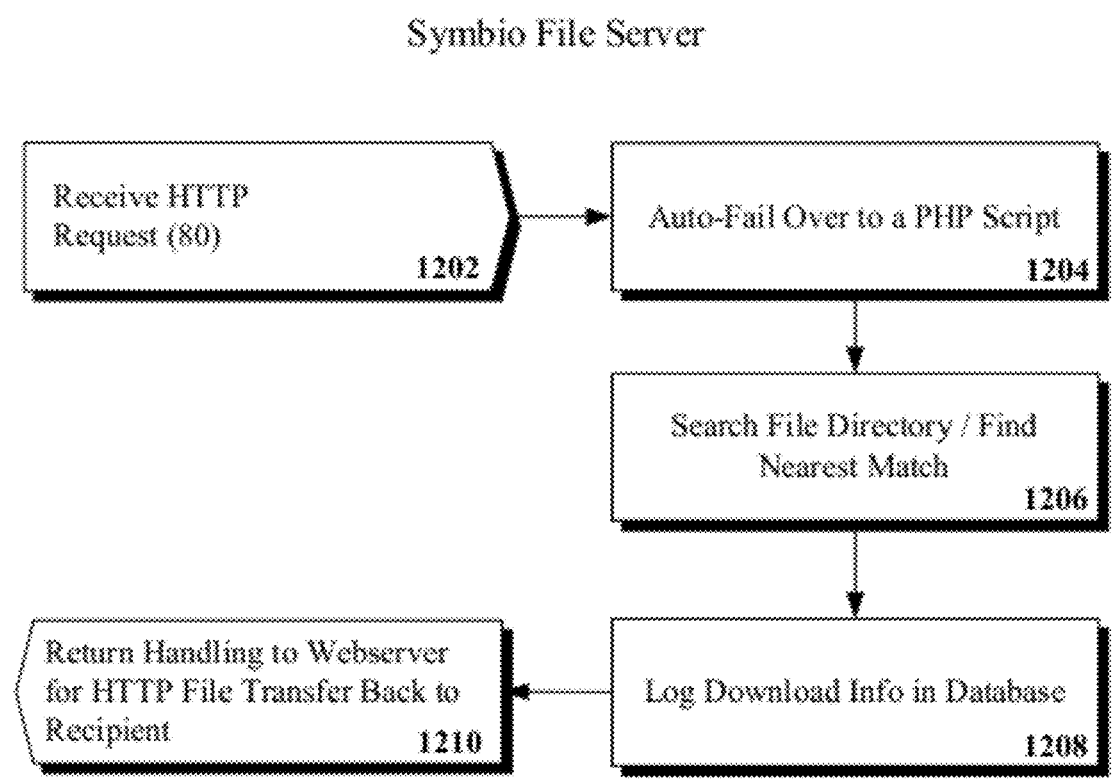
FIG. 12 shows the functionality of one embodiment of the File Server in accordance with embodiments of the inventive arrangements disclosed herein.

FIG. 12 details the basic operation of the File Server 418 and its differences from a normal web server. Once an I-HTP request is received (step 1202), it is checked to see if it immediately matches the files on disk. If yes, the file is transmitted normally without any changes or further searches. If no, it goes into a fail-over PHP script (step 1204) that searches the directories for the closest matching file (step 1206). When searching for the closest matching file, the File Server 418 matches the files on record to the search request from left to right. For example, if the search request is "Lead Pencil's— nap time—like Metallica.mp3" it will match the file to "Lead Pencil's nap time.mp3." The resulting transaction is logged in a local database or flat file (step 1208). The handling for the file is then handed over to the web server (step 1210) for a normal file download.

Figure 13:
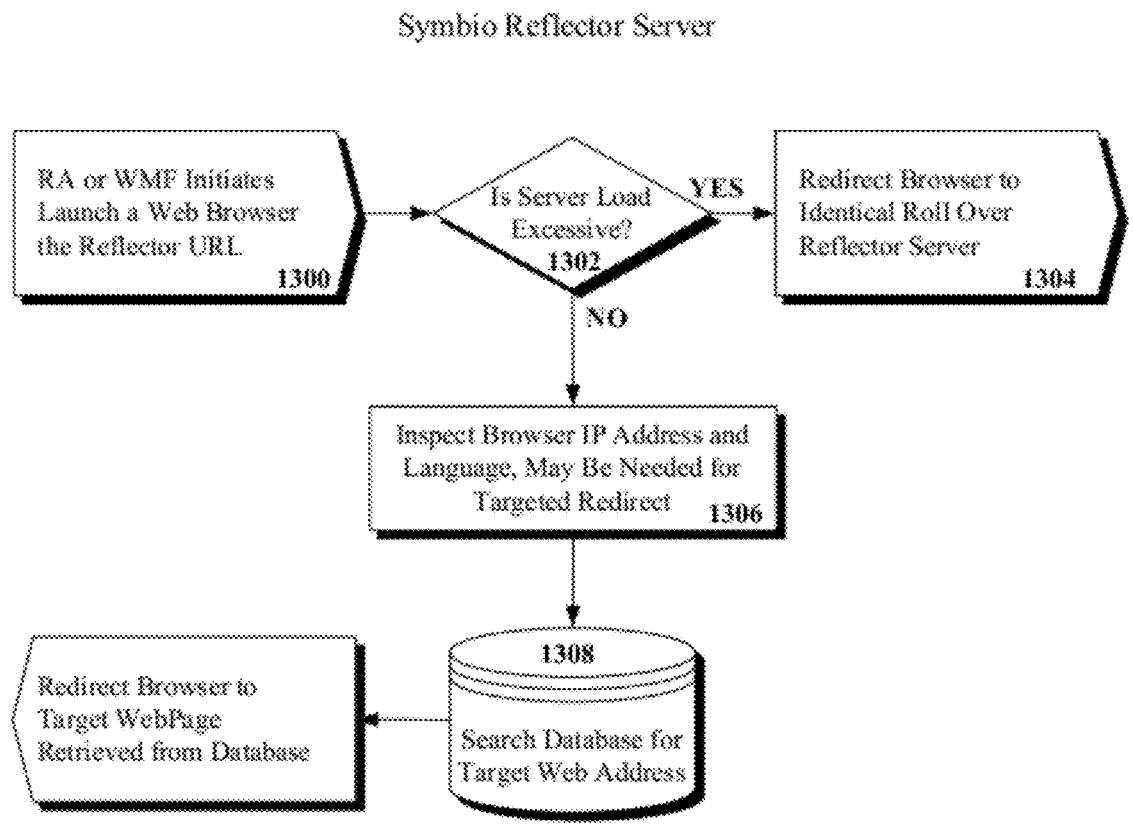
FIG. 13 is a flow chart illustrating the functionality of one embodiment of the Reflector Server in accordance with embodiments of the inventive arrangements disclosed herein.

Referring to FIG. 13 details the process by which the Reflector Server 426 is contacted and how it functions. A media file, usually an RA or a WMF (but not exclusively) is run by a user (step 1300). Upon loading the media file it preferably gives instructions to the user's computer to launch a web browser pointed at a particular website. In this embodiment, the web browser will be pointed to the Reflector Server 426. The first test by the Reflector Server 406 is for excess load (decision 1302). In other words, the server must not be so busy that it is incapable of handling the request. If the server load is already too great the user's web browser will be redirected to another server, identical in configuration to the "referring" reflector server (step 1304). If server load is within reasonable limits such that a response can be generated quickly (step 1306), then the Result Server 404 will request specialized information from the user's browser. IP Address as well as the default language of the browser is checked. This allows us to customize our advertisements to a physical region (tracked by the IP address) as well as to the user's preferred language (i.e., Spanish). Given this information, as well as a unique ID sent by the media file through the web browser, the appropriate advertisement is selected (step 1308) and the user is server-side-redirected to the actual advertisement on another web server. This entire process takes less than one second and requires no input from the user. The user will usually never see the Reflector Server, only the resulting advertisement.

The system 400 provides a scheme for using software for the utilization of P2P file sharing networks by media advertisers who wish to direct target potential customers. It uses native protocol emulation and takes advantage of the natural anonymity of such networks. It intercepts searches and responds in kind to them. The user then can then download search results at the best possible speed and efficiency and can enjoy the media, along with its associated targeted advertisements. It comprises eight primary elements including:

1. Providing connection to a given P2P file-sharing network.
2. Stealth operation to prevent hacker retaliation.
3. Intercepting and responding to search requests, through associated keywords.
4. Filtering out hostile search requests meant to ferret out Result Server or other advertisers.
5. Redirecting a download to a specialized and low cost file server, allowing us to control and segment our available bandwidth.
6. Specially formatted media containing instructions to pop-up advertisement windows.
7. A server dedicated to logging and directing advertisement windows to their most appropriate advertisements.
8. Active logging of all events at all levels.

It adds protection against hostile hackers and profiling systems. It is fully automated and makes maximum use of available bandwidth in order to get the most out of the user's advertising dollar, allowing media producers to benefit from P2P networks that are otherwise costing them billions every year.

Therefore, while there has been described one particular embodiment in detail, it will be understood by those skilled in the art that other modifications can be made within the spirit of the invention.

In various embodiments, networks 102, 202, 450 and peer to peer network 402 can include any hardware/software/and firmware necessary to convey data encoded within carrier waves. Data can be contained within analog or digital signals and conveyed though data or voice channels. Networks 102, 202, 450 and peer to peer network 402 can include local components and data pathways necessary for communications to be exchanged among computing device components and between integrated device components and peripheral devices. Networks 102, 202, 450 and peer to peer network 402 can also include network equipment, such as routers, data lines, hubs, and intermediary servers which together form a data network, such as the Internet. Networks 102, 202, 450 and peer to peer network 402 can also include circuit-based communication components and mobile communication components, such as telephony switches, modems, cellular communication towers, and the like. Networks 102, 202, 450 and peer to peer network 402 can include line based and/or wireless communication pathways.

Data store 125, 135, 145, 245, 408, 419, 428 can represent data stores able to be physically implemented within any type of hardware including, but not limited to, a magnetic disk, an optical disk, a semiconductor memory, a digitally encoded plastic memory, a holographic memory, or any other recording medium. Data stores 125, 135, 145, 245, 408, 419, 428 can be a stand-alone storage unit as well as a storage unit formed from a plurality of physical devices. Additionally, information can be stored within data stores 125, 135, 145, 245, 408, 419, 428 in a variety of manners. For example, information can be stored within a database structure or can be stored within one or more files of a file storage system, where each file may or may not be indexed for information searching purposes. Further, data stores 125, 135, 145, 245, 408, 419, 428 can utilize one or more encryption mechanisms to protect stored information from unauthorized access.

As used in embodiments of the disclosure, peer-to-peer (P2P) computing or networking is a distributed application architecture that partitions tasks or workloads among peers. In various embodiments of the disclosure, any of a variety of different types of P2P systems can be utilized for advertising, as detailed herein. That is, secure and/or unsecure P2P systems can be utilized. Further, pure, hybrid, and/or centralized P2P networks can provide advertisements in accordance with the details expressed herein in various contemplated embodiments. Moreover structured and/or unstructured P2P networks can provide advertisements in accordance with the details expressed herein in various contemplated embodiments.

In P2P, peers can be equally privileged, equipotent participants in the application. They are said to form a peer-to-peer network of nodes. Peers make a portion of their resources, such as processing power, disk storage or network bandwidth, directly available to other network participants, without the need for central coordination by servers or stable hosts. Peers are both suppliers and consumers of resources, in contrast to the traditional client-server model where only servers supply (send), and clients consume (receive).

Peer-to-peer systems often implement an abstract overlay network, built at Application Layer, on top of the native or physical network topology. Such overlays are used for indexing and peer discovery and make the P2P system independent from the physical network topology. Content is typically exchanged directly over the underlying Internet Protocol (IP) network. Anonymous peer-to-peer systems are an exception, and implement extra routing layers to obscure the identity of the source or destination of queries.

In structured peer-to-peer networks, peers (and, sometimes, resources) are organized following specific criteria and algorithms, which lead to overlays with specific topologies and properties. They typically use distributed hash table-based (DHT) indexing, such as in the Chord System™.

Unstructured peer-to-peer networks do not impose any structure on the overlay networks. Peers in these networks connect in an ad-hoc fashion. Ideally, unstructured P2P systems would have absolutely no centralized system, but in practice there are several types of unstructured systems with various degrees of centralization. Three categories can easily be seen.

In pure peer-to-peer systems the entire network consists solely of equipotent peers. There is only one routing layer, as there are no preferred nodes with any special infrastructure function.

Hybrid peer-to-peer systems allow such infrastructure nodes to exist, often called supernodes.

In centralized peer-to-peer systems, a central server is used for indexing functions and to bootstrap the entire system. Although this has similarities with a structured architecture, the connections between peers are not determined by any algorithm.

Napster™ was an example of the centralized model of a P2P network. Freenet™ and early implementations of the Gnutella™ protocol, on the other hand, are examples of the decentralized model. Modern Gnutella™ implementations, Gnutella2™, as well as the now deprecated Kazaa™ network are examples of the hybrid model.

A pure P2P network does not have the notion of clients or servers but only equal peer nodes that simultaneously function as both "clients" and "servers" to the other nodes on the network. This model of network arrangement differs from the client-server model where communication is usually to and from a central server. A typical example of a file transfer that does not use the P2P model is the File Transfer Protocol (FTP) service in which the client and server programs are distinct: the clients initiate the transfer, and the servers satisfy these requests.

The P2P overlay network consists of all the participating peers as network nodes. There are links between any two nodes that know each other: i.e. if a participating peer knows the location of another peer in the P2P network, then there is a directed edge from the former node to the latter in the overlay network. Based on how the nodes in the overlay network are linked to each other, we can classify the P2P networks as unstructured or structured.

Structured P2P networks employ a globally consistent protocol to ensure that any node can efficiently route a search to some peer that has the desired file, even if the file is extremely rare. Such a guarantee necessitates a more structured pattern of overlay links. By far the most common type of structured P2P network is the distributed hash table (DHT), in which a variant of consistent hashing is used to assign ownership of each file to a particular peer, in a way analogous to a traditional hash table's assignment of each key to a particular array slot.

Distributed hash tables (DHTs) are a class of decentralized distributed systems that provide a lookup service similar to a hash table: (key, value) pairs are stored in the DHT, and any participating node can efficiently retrieve the value associated with a given key. Responsibility for maintaining the mapping from keys to values is distributed among the nodes, in such a way that a change in the set of participants causes a minimal amount of disruption. This allows DHTs to scale to extremely large numbers of nodes and to handle continual node arrivals, departures, and failures.

DHTs form an infrastructure that can be used to build peer-to-peer networks. Notable distributed networks that use DHTs include BitTorrent's™ distributed tracker, the Kad Network™, the Storm Botnet™, YaCy™, and the Coral Content Distribution Network™.

Some prominent research projects include the Chord project, the PAST storage utility, the P-Grid, a self-organized and emerging overlay network and the CoopNet content distribution system.

DHT-based networks have been widely utilized for accomplishing efficient resource discovery for grid computing systems, as it aids in resource management and scheduling of applications. Resource discovery activity involves searching for the appropriate resource types that match the user's application requirements. Recent advances in the domain of decentralized resource discovery have been based on extending the existing DHTs with the capability of multi-dimensional data organization and query routing. Majority of the efforts have looked at embedding spatial database indices such as the Space Filling Curves (SFCs) including the Hilbert curves, Z-curves, k-d tree, MX-CIF Quad tree and R*-tree for managing, routing, and indexing of complex Grid resource query objects over DHT networks. Spatial indices are well suited for handling the complexity of Grid resource queries. Although some spatial indices can have issues as regards to routing load-balance in case of a skewed data set, all the spatial indices are more scalable in terms of the number of hops traversed and messages generated while searching and routing Grid resource queries.

An unstructured P2P network is formed when the overlay links are established arbitrarily. Such networks can be easily constructed as a new peer that wants to join the network can copy existing links of another node and then form its own links over time. In an unstructured P2P network, if a peer wants to find a desired piece of data in the network, the query has to be flooded through the network to find as many peers as possible that share the data. The main disadvantage with such networks is that the queries may not always be resolved. Popular content is likely to be available at several peers and any peer searching for it is likely to find the same thing. But if a peer is looking for rare data shared by only a few other peers, then it is highly unlikely that search will be successful. Since there is no correlation between a peer and the content managed by it, there is no guarantee that flooding will find a peer that has the desired data. Flooding also causes a high amount of signaling traffic in the network and hence such networks typically have very poor search efficiency. Many of the popular P2P networks are unstructured.

In pure P2P networks: Peers act as equals, merging the roles of clients and server. In such networks, there is no central server managing the network, neither is there a central router. Some examples of pure P2P Application Layer networks designed for peer-to-peer file sharing are Gnutella (pre v0.4) and Freenet™.

There also exist hybrid P2P systems, which distribute their clients into two groups: client nodes and overlay nodes. Typically, each client is able to act according to the momentary need of the network and can become part of the respective overlay network used to coordinate the P2P structure. This division between normal and 'better' nodes is done in order to address the scaling problems on early pure P2P networks. As examples for such networks can be named modern implementations of Gnutella (after v0.4) and Gnutella2™.

Another type of hybrid P2P network are networks using on the one hand central server(s) or bootstrapping mechanisms, on the other hand P2P for their data transfers. These networks are in general called 'centralized networks' because of their lack of ability to work without their central server(s). An example for such a network is the eDonkey™ network (often also called eD2k).

Older peer-to-peer networks duplicate resources across each node in the network configured to carry that type of information. This allows local searching, but requires much traffic.

Modern networks use central coordinating servers and directed search requests. Central servers are typically used for listing potential peers (Tor), coordinating their activities (Folding@Home™), and searching (Napster™, eMule™). Decentralized searching was first done by flooding search requests out across peers. More efficient directed search strategies, including supernodes and distributed hash tables, are now used.

Many P2P systems use stronger peers (super-peers, supernodes) as servers and client-peers are connected in a star-like fashion to a single super-peer.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for distributing media files over a peer-to-peer network, the method comprising:

configuring an information handling system to act as a node in the peer-to-peer network, said peer-to-peer network being organized loosely without any centralized management authority, said information handling system being further configured to follow rules and protocols of the de-centralized peer-to-peer network, the information handling system comprising a result server and a file server;

controlling, with the file server, a database of stored media files, wherein each of the stored media files encodes a material and contains embedded executable code, said embedded executable code causing at least one advertisement to be presented to request issuing peers of the peer-to-peer network each time a requested media file is utilized;

probing, with the result server, network traffic to discover file search requests from the request issuing peers, said file search requests seeking one or more materials;

searching, with the result server, a database for names of media files satisfying a discovered file search request; and conveying, with the result server, search results to a request issuing peer, said search results comprising names of a set of one or more media files satisfying the discovered file search request and a link associated with each file name in the set, wherein each link, when activated by the request issuing peer, causes transmission of a request to the file server for a media file associated with the link, wherein the file server responds to the request by sending the requested media file to the request issuing peer, comprising a copy of the sought material and the embedded executable code, and wherein each time the received media file from the file server is utilized, the embedded executable code is triggered and presents the request issuing peer with at least one advertisement before or during playback of the material of the media file.

2. The method of claim 1, wherein the received media file is a video file, a streamed set video files, or an interactive software executable, wherein the at least one advertisement is presented when the video file, the steamed set of video files, or the interactive software executable is presented on a computing device of the request issuing peer.

3. The method of claim 1,
wherein the material is a copyrighted material, and wherein the at least one advertisement is being presented with the cooperation and volition of a company holding rights to the copyrighted material.

4. The method of claim 1,
wherein the material is a copyrighted material, wherein the sending of the requested media file by the information handling system occurs with the full cooperation and volition of a company having legal rights to disseminate the copyrighted material, wherein said method provides a media distributor with a means for deriving profit from peer-to-peer network file sharing of copyrighted material, wherein the at least one advertisement, is served by a server, which locates an appropriate advertisement at a time that the received media file is utilized, wherein advertisement content is unknown until the time the received media file is utilized, and wherein the information presented comprises targeted advertising specific to the received search criteria of the discovered file search request or to a user of the received media file.

5. An information handling system, comprising:
a result server comprising at least one computer processor, an input receiving component, a search engine, and a server logic that execute upon the at least one computer processor; and
a file server controlling a database of stored media files, wherein each of the stored media files encodes a material and contains embedded executable code, said embedded executable code causing at least one advertisement to be presented to request issuing peers of a peer-to-peer network each time a requested media file is utilized,
wherein said information handling system is configured to act as a node in the peer-to-peer network, said peer-to-peer network being organized loosely without any centralized management authority, said information handling system being further configured to follow rules and protocols of the de-centralized peer-to-peer network,
said input receiving component configured to probe network traffic to discover file search requests from the request issuing peers, said file search requests seeking one or more materials;
said search engine configured to search a database for names of media files satisfying a discovered file search request; and
said server logic configured to convey search results to a request issuing peer, said search results comprising names of a set of one or more media files satisfying the discovered file search request and a link associated with each file name in the set,
wherein each link, when activated by the request issuing peer, causes transmission of a request to the file server for a media file associated with the link,
wherein the file server responds to the request by sending the requested media file to the request issuing peer, comprising a copy of the sought material and the embedded executable code, and
wherein each time the received media file from the file server is utilized, the embedded executable code is triggered and presents the request issuing peer with at least one advertisement before or during playback of the material of the media file.

6. The system of claim 5, wherein the at least one advertisement that is presented before or during playback of the material of the media file is selected at a time the embedded executable code is executed, wherein the at least one advertisement is targeted to an individual identified as a user requesting the playback of the material of the media file and therefore varies from user-to-user and from playback-time to playback-time.

7. The system of claim 5, wherein each of the media files comprises a unique identifier, wherein the unique identifier is not changed in-between multiple copies of each media file and if media file name is altered, wherein each of said one or more advertisements is associated with the unique identifier, wherein the at least one advertisement provides a media distributor with a means for deriving profit from peer-to-peer network file sharing, and wherein a request for information is transmitted to the information handling system responsive to a user command to run the received media file.

8. The system of claim 7, wherein an entity associated with the at least one advertisement financially compensates a different entity that discovered a file search request and provided the received media file in response, and wherein the at least one advertisement is a targeted advertisement specifically selected as being appropriate for the received media file.

9. The system of claim 8, wherein said peer-to-peer network consists of a computer network in which members have equal rights to one another, and wherein the peer-to-peer network allows members to use each other's hard-drives equally.

10. The system of claim 7, wherein when the user of the received media file activates a player to play the file, the request issuing peer automatically contacts an advertising server corresponding to the at least one advertisement.

11. The system of claim 10, wherein the request issuing peer can bypass playing back the at least one advertisement before accessing the requested material by possessing an unlock key, wherein the unlock key was purchased by the user of the request issuing peer.

12. The system of claim 5, wherein the at least one advertisement, is served by a server, which locates an appropriate advertisement at a time that the received media file is utilized, wherein advertisement content is unknown until the time the received media file is utilized.

13. The system of claim 5, wherein the received media file is a video file or a streamed set of video files, wherein the at least one advertisement is presented when the video file or the streamed set of video files are played by a media playback device of the request issuing peer.

14. The system of claim 5, wherein the received media file is an interactive software executable, wherein the at least one advertisement is presented when the interactive software executable is interactively presented on a computing device of the request issuing peer.

15. The system of claim 5,
wherein the database of stored media files is implemented in a non-transitory storage medium, wherein the material, is a copyrighted material, and wherein the at least one advertisement is being presented with the cooperation and volition of a company holding rights to the copyrighted material.

16. The system of claim 15, wherein
the link is presented to the request issuing peer in the form of a hyperlink associated with each file name.

17. The system of claim 5, wherein the received media file includes material similar to, but not exactly matching the one or more materials the request issuing peer is seeking in the discovered file search request.

18. A computer program product comprising:

one or more computer-readable, non-transitory storage mediums;

program instructions, stored on at least one of the one or more computer-readable, non-transitory storage mediums to configure an information handling system to act as a node in a peer-to-peer network, said peer-to-peer network being organized loosely without any centralized management authority, to configure said information handling system to follow rules and protocols of the de-centralized peer-to-peer network, the information handling system comprising a result server and a file server;

program instructions, stored on at least one of the one or more computer-readable, non-transitory storage mediums to control, with the file server, a database of stored media files, wherein each of the stored media files encodes a material and contains embedded executable code, said embedded executable code causing at least one advertisement to be presented to request issuing peers of the peer-to-peer network each time a requested media file is utilized;

program instructions, stored on at least one of the one or more computer-readable, non-transitory storage mediums to probe, with the result server, network traffic to discover file search requests from the request issuing peers, said file search requests seeking one or more materials;

program instructions, stored on at least one of the one or more computer-readable, non-transitory storage mediums to search, with the result server, a database for names of media files satisfying a discovered file search request; and program instructions, stored on at least one of the one or more computer-readable, non-transitory storage mediums to convey, with the result server, search results to a request issuing peer, said search results comprising names of a set of one or more media files satisfying the discovered file search request and a link associated with each file name in the set, wherein each link, when activated by the request issuing peer, causes transmission of a request to the file server for a media file associated with the link, wherein the file server responds to the request by sending the requested media file to the request issuing peer, comprising a copy of the sought material and the embedded executable code, and wherein each time the received media file from the file server is utilized, the embedded executable code is triggered and presents the request issuing peer with at least one advertisement before or during playback of the material of the media file.

19. The computer program product of claim 18, wherein the received media file is a video file, a streamed set video files, or an interactive software executable, wherein the at least one advertisement is presented when the video file, the steamed set of video files, or the interactive software executable is presented on a computing device of the request issuing peer.

20. The computer program product of claim 18, wherein the material is a copyrighted material, and wherein the at least one advertisement is being presented with the cooperation and volition of a company holding rights to the copyrighted material.

21. The computer program product of claim 18, wherein the material is a copyrighted material, wherein the sending of the requested media file by the information handling system occurs with the full cooperation and volition of a company having legal rights to disseminate the copyrighted material, wherein said method provides a media distributor with a means for deriving profit from peer-to-peer network file sharing of copyrighted material, wherein the at least one advertisement is served by a server, which locates an appropriate advertisement at a time that the received media file is utilized, wherein advertisement content is unknown until the time the received media file is utilized, and wherein the information presented comprises targeted advertising specific to the received search criteria of the discovered file search request or to a user of the received media file.

* * * * *